United States Patent
Beygel et al.

(10) Patent No.: US 12,420,616 B2
(45) Date of Patent: Sep. 23, 2025

(54) MULTI-COMPRESSOR OIL MIGRATION MITIGATION CLIMATE SYSTEM

(71) Applicant: Bergstrom, Inc., Rockford, IL (US)

(72) Inventors: Yevgeniy Beygel, Long Grove, IL (US); Brett Herrmann, Rochelle, IL (US); Alexander Victor Puzin, Cherry Valley, IL (US); Ian Boyes, Wimborne (GB)

(73) Assignee: BERGSTROM, INC., Rockford, IL (US)

( * ) Notice: Subject to any disclaimer, the term of this patent is extended or adjusted under 35 U.S.C. 154(b) by 341 days.

(21) Appl. No.: 17/972,932

(22) Filed: Oct. 25, 2022

(65) Prior Publication Data

US 2023/0124191 A1    Apr. 20, 2023

Related U.S. Application Data

(63) Continuation-in-part of application No. 16/922,855, filed on Jul. 7, 2020, now Pat. No. 11,479,086, which
(Continued)

(51) Int. Cl.
*B60H 1/32*    (2006.01)
*B60H 1/00*    (2006.01)
(Continued)

(52) U.S. Cl.
CPC ....... *B60H 1/3214* (2013.01); *B60H 1/00849* (2013.01); *B60H 1/00864* (2013.01);
(Continued)

(58) Field of Classification Search
CPC .............. B60H 1/3214; B60H 1/00849; B60H 1/00864; B60H 1/3223; B60H 1/323;
(Continued)

(56) References Cited

U.S. PATENT DOCUMENTS 2,156,426 A    5/1939 Brown et al.
2,722,050 A    11/1955 Shank
(Continued)

FOREIGN PATENT DOCUMENTS

CN    1468409 A    1/2004
CN    2883071 Y    3/2007
(Continued)

OTHER PUBLICATIONS

Alfa Laval Website http://www.alfalaval.com/ecore-Java/WebObjects/ecoreJava.woa/wa/shoNode?siteNodeIID=1668&cont . . . ; date last visited May 18, 2007; 1 page.
(Continued)

*Primary Examiner* — Emmanuel E Duke
(74) *Attorney, Agent, or Firm* — Morgan, Lewis & Bockius LLP

(57) ABSTRACT

Disclosed are climate systems and methods for control the climate systems. A climate system includes a refrigerant circuit, a first compressor, a second compressor, a first refrigerant-to-air heat exchanger, a second refrigerant-to-air heat exchanger, and a controller communicatively coupled to the first and second compressors. Respective outlets of the first and second compressors are fluidically coupled to the first refrigerant-to-air heat exchanger, the first refrigerant-to-air heat exchanger is fluidically coupled to the second refrigerant-to-air heat exchanger, and the second refrigerant-to-air heat exchanger is fluidically coupled with respective inlets of the first and second compressors. The fluidic connection between the second refrigerant-to-air heat exchanger and the first and second compressors includes a vertical split that is configured to mitigate or reduce the amount of compressor oil that migrates to dormant components.

30 Claims, 8 Drawing Sheets

Related U.S. Application Data is a continuation of application No. 16/133,599, filed on Sep. 17, 2018, now Pat. No. 10,703,173, which is a continuation of application No. 15/280,876, filed on Sep. 29, 2016, now Pat. No. 10,081,226.

(60) Provisional application No. 63/347,544, filed on May 31, 2022, provisional application No. 62/378,135, filed on Aug. 22, 2016.

(51) Int. Cl.
*F25B 31/00* (2006.01)
*F25B 49/02* (2006.01)

(52) U.S. Cl.
CPC ........... *B60H 1/3223* (2013.01); *B60H 1/323* (2013.01); *F25B 31/004* (2013.01); *F25B 49/022* (2013.01); *F25B 49/027* (2013.01); *B60H 2001/3238* (2013.01); *B60H 2001/3255* (2013.01); *B60H 2001/3272* (2013.01); *F25B 2400/075* (2013.01); *F25B 2600/01* (2013.01); *F25B 2600/0251* (2013.01); *F25B 2600/0253* (2013.01); *F25B 2600/111* (2013.01); *F25B 2700/2104* (2013.01); *F25B 2700/2106* (2013.01)

(58) Field of Classification Search
CPC .... B60H 2001/3238; B60H 2001/3272; B60H 2001/3261; F25B 31/004; F25B 31/002; F25B 49/022; F25B 49/027; F25B 49/02; F25B 2400/075; F25B 2600/01; F25B 2600/0251; F25B 2600/0253; F25B 2600/111; F25B 2700/2104; F25B 2700/2106

See application file for complete search history.

(56) References Cited

U.S. PATENT DOCUMENTS

| | | |
|---|---|---|
| 2,789,234 A | 4/1957 | Lambert et al. |
| 3,176,502 A | 4/1965 | Cizek et al. |
| 3,225,819 A | 12/1965 | Stevens |
| 3,360,958 A | 1/1968 | Miner |
| 3,590,910 A | 7/1971 | Lorenz |
| 3,627,030 A | 12/1971 | Lorenz |
| 3,807,087 A | 4/1974 | Staats |
| 3,844,130 A | 10/1974 | Wahnish |
| 3,880,224 A | 4/1975 | Weil |
| 3,885,398 A | 5/1975 | Dawkins |
| 3,938,349 A | 2/1976 | Ueno |
| 3,948,060 A | 4/1976 | Gaspard |
| 3,995,443 A | 12/1976 | Iversen |
| 4,015,182 A | 3/1977 | Erdman |
| 4,034,801 A | 7/1977 | Bermstein |
| 4,071,080 A | 1/1978 | Bridgers |
| 4,217,764 A | 8/1980 | Armbruster |
| 4,266,405 A | 5/1981 | Trask |
| 4,271,677 A | 6/1981 | Harr |
| 4,280,330 A | 7/1981 | Harris et al. |
| 4,324,286 A | 4/1982 | Brett |
| 4,359,875 A | 11/1982 | Ohtani |
| 4,383,802 A * | 5/1983 | Gianni ............... F04C 23/001 62/193 |
| 4,391,321 A | 7/1983 | Thunberg |
| 4,412,425 A | 11/1983 | Fukami et al. |
| 4,448,157 A | 5/1984 | Eckstein et al. |
| 4,459,519 A | 7/1984 | Erdman |
| 4,577,679 A | 3/1986 | Hibshman |
| 4,604,036 A | 8/1986 | Sutou et al. |
| 4,617,472 A | 10/1986 | Slavik |
| 4,641,502 A | 2/1987 | Aldrich et al. |
| 4,658,593 A | 4/1987 | Stenvinkel |
| 4,667,480 A | 5/1987 | Bessler |
| 4,694,798 A | 9/1987 | Kato et al. |
| 4,748,825 A | 6/1988 | King |
| 4,825,663 A | 5/1989 | Nijar et al. |
| 4,841,733 A | 6/1989 | Dussault et al. |
| 4,856,078 A | 8/1989 | Konopka |
| 4,893,479 A | 1/1990 | Gillett et al. |
| 4,897,798 A | 1/1990 | Cler |
| 4,905,478 A | 3/1990 | Matsuda et al. |
| 4,945,977 A | 8/1990 | D'Agaro |
| 4,947,657 A | 8/1990 | Kalmbach |
| 4,952,283 A | 8/1990 | Besik |
| 4,982,576 A | 1/1991 | Proctor et al. |
| 5,025,634 A | 6/1991 | Dressler |
| 5,046,327 A | 9/1991 | Walker |
| 5,067,652 A | 11/1991 | Enander |
| 5,095,308 A | 3/1992 | Hewitt |
| 5,125,236 A | 6/1992 | Clancey et al. |
| 5,170,639 A | 12/1992 | Datta |
| 5,205,781 A | 4/1993 | Kanno et al. |
| 5,230,719 A | 7/1993 | Berner et al. |
| 5,269,153 A | 12/1993 | Cawley |
| 5,275,012 A | 1/1994 | Dage et al. |
| 5,307,645 A | 5/1994 | Pannell |
| 5,316,074 A | 5/1994 | Isaji et al. |
| 5,324,229 A | 6/1994 | Weisbecker |
| 5,327,997 A | 7/1994 | Nash, Jr. et al. |
| 5,333,678 A | 8/1994 | Mellum et al. |
| 5,361,593 A | 11/1994 | Dauvergne |
| 5,376,866 A | 12/1994 | Erdman |
| 5,396,779 A | 3/1995 | Voss |
| 5,402,844 A | 4/1995 | Elluin |
| 5,404,730 A | 4/1995 | Westermeyer |
| 5,426,953 A | 6/1995 | Meckler |
| 5,465,589 A | 11/1995 | Bender et al. |
| 5,497,941 A | 3/1996 | Numazawa et al. |
| 5,501,267 A | 3/1996 | Iritani et al. |
| 5,502,365 A | 3/1996 | Nanbu et al. |
| 5,524,442 A | 6/1996 | Bergmen, Jr. et al. |
| 5,528,901 A | 6/1996 | Willis |
| 5,562,538 A | 10/1996 | Suyama |
| 5,586,613 A | 12/1996 | Ehsani |
| 5,605,058 A | 2/1997 | Kurachi |
| 5,641,016 A | 6/1997 | Isaji et al. |
| 5,647,534 A | 7/1997 | Kelz et al. |
| 5,657,638 A | 8/1997 | Erdman et al. |
| 5,682,757 A | 11/1997 | Peterson |
| 5,720,181 A | 2/1998 | Karl et al. |
| 5,727,396 A | 3/1998 | Boyd |
| 5,752,391 A | 5/1998 | Ozaki et al. |
| 5,761,918 A | 6/1998 | Jackson et al. |
| 5,775,415 A | 7/1998 | Yoshini et al. |
| 5,782,610 A | 7/1998 | Ikeda |
| 5,819,549 A | 10/1998 | Sherwood |
| 5,896,750 A | 4/1999 | Karl |
| 5,898,995 A | 5/1999 | Ghodbane |
| 5,899,081 A | 5/1999 | Evans et al. |
| 5,901,572 A | 5/1999 | Peiffer et al. |
| 5,901,780 A | 5/1999 | Zeigler et al. |
| 5,921,092 A | 7/1999 | Behr et al. |
| 5,934,089 A | 8/1999 | Magakawa et al. |
| 5,982,643 A | 11/1999 | Phlipot |
| 5,996,363 A | 12/1999 | Kurachi et al. |
| 6,016,662 A | 1/2000 | Tanaka et al. |
| 6,021,043 A | 2/2000 | Horng |
| 6,028,406 A | 2/2000 | Birk |
| 6,029,465 A | 2/2000 | Bascobert |
| 6,038,877 A | 3/2000 | Peiffer et al. |
| 6,038,879 A | 3/2000 | Turcotte |
| 6,059,016 A | 5/2000 | Rafalovich et al. |
| 6,072,261 A | 6/2000 | Lin |
| 6,073,456 A | 6/2000 | Kawai et al. |
| 6,111,731 A | 8/2000 | Cepynsky |
| 6,112,535 A | 9/2000 | Hollenbeck |
| 6,122,929 A | 9/2000 | Yamasaki |
| 6,125,642 A | 10/2000 | Seener et al. |
| 6,134,901 A | 10/2000 | Harvest et al. |
| 6,152,217 A | 11/2000 | Ito et al. |
| 6,185,959 B1 | 2/2001 | Zajac |
| 6,193,475 B1 | 2/2001 | Rozek |

(56) References Cited

U.S. PATENT DOCUMENTS

| | | |
|---|---|---|
| 6,205,795 B1 | 3/2001 | Backman et al. |
| 6,205,802 B1 | 3/2001 | Drucker et al. |
| 6,209,333 B1 | 4/2001 | Bascobert |
| 6,209,622 B1 | 4/2001 | Lagace et al. |
| 6,213,867 B1 | 4/2001 | Yazici |
| 6,230,507 B1 | 5/2001 | Ban et al. |
| 6,232,687 B1 | 5/2001 | Hollenbeck et al. |
| 6,253,563 B1 | 7/2001 | Ewert et al. |
| 6,265,692 B1 | 7/2001 | Umebayahi et al. |
| 6,276,161 B1 | 8/2001 | Peiffer et al. |
| 6,282,919 B1 | 9/2001 | Rockenfeller |
| 6,318,103 B1 | 11/2001 | Rieger et al. |
| 6,351,957 B2 | 3/2002 | Hara |
| 6,405,793 B1 | 6/2002 | Ghodbane et al. |
| 6,411,059 B2 | 6/2002 | Frugier et al. |
| 6,453,678 B1 | 9/2002 | Sundhar |
| 6,457,324 B2 | 10/2002 | Zeigler et al. |
| 6,467,279 B1 | 10/2002 | Backman et al. |
| 6,474,081 B1 | 11/2002 | Feuerecker |
| 6,490,876 B2 | 12/2002 | Derryberry |
| 6,530,426 B1 | 3/2003 | Kishita et al. |
| 6,543,245 B1 | 4/2003 | Waldschmidt |
| 6,571,566 B1 | 6/2003 | Temple et al. |
| 6,575,228 B1 | 6/2003 | Ragland et al. |
| 6,626,003 B1 | 9/2003 | Kortüm et al. |
| 6,651,448 B2 | 11/2003 | Ross |
| 6,662,592 B2 | 12/2003 | Ross |
| 6,675,601 B2 | 1/2004 | Ebara |
| 6,684,863 B2 | 2/2004 | Dixon et al. |
| 6,725,134 B2 | 4/2004 | Dillen et al. |
| 6,745,585 B2 | 6/2004 | Kelm et al. |
| 6,748,750 B2 | 6/2004 | Choi |
| 6,758,049 B2 | 7/2004 | Adachi et al. |
| 6,889,762 B2 | 5/2005 | Zeigler et al. |
| 6,932,148 B1 | 8/2005 | Brummett et al. |
| 6,939,114 B2 | 9/2005 | Iwanami et al. |
| 6,965,818 B2 | 11/2005 | Koenig et al. |
| 6,981,544 B2 | 1/2006 | Iwanami et al. |
| 6,992,419 B2 | 1/2006 | Kim et al. |
| 7,131,281 B2 | 11/2006 | Salim et al. |
| 7,135,799 B2 | 11/2006 | Rittmeyer |
| 7,150,159 B1 | 12/2006 | Brummett et al. |
| 7,246,502 B2 | 7/2007 | Hammonds et al. |
| 7,316,119 B2 | 1/2008 | Allen |
| 7,350,368 B2 | 4/2008 | Heberle et al. |
| 7,385,323 B2 | 6/2008 | Takahashi et al. |
| 7,591,143 B2 | 9/2009 | Zeigler et al. |
| 7,591,303 B2 | 9/2009 | Ziegler et al. |
| 7,614,242 B1 | 11/2009 | Quesada Saborio |
| 7,637,031 B2 | 12/2009 | Salim et al. |
| 7,765,824 B2 | 8/2010 | Wong et al. |
| 7,821,175 B2 | 10/2010 | Ionel et al. |
| 7,932,658 B2 | 4/2011 | Ionel |
| 8,001,799 B2 | 8/2011 | Obayashi et al. |
| 8,141,377 B2 | 3/2012 | Connell |
| 8,156,754 B2 | 4/2012 | Hong et al. |
| 8,276,892 B2 | 10/2012 | Narikawa et al. |
| 8,492,948 B2 | 7/2013 | Wang et al. |
| 8,517,087 B2 | 8/2013 | Zeigler et al. |
| 8,821,092 B2 | 9/2014 | Nambara et al. |
| 8,841,813 B2 | 9/2014 | Junak et al. |
| 8,905,071 B2 | 12/2014 | Coombs et al. |
| 8,919,140 B2 | 12/2014 | Johnson et al. |
| 8,947,531 B2 | 2/2015 | Fischer et al. |
| 9,157,670 B2 | 10/2015 | Kreeley et al. |
| 9,216,628 B2 | 12/2015 | Self et al. |
| 9,221,409 B1 | 12/2015 | Gauthier et al. |
| 9,327,578 B2 | 5/2016 | Itoh |
| 9,670,933 B2 | 6/2017 | Yoo et al. |
| 9,783,024 B2 | 10/2017 | Connell et al. |
| 9,878,591 B2 | 1/2018 | Taniguchi et al. |
| 10,267,546 B2 | 4/2019 | Evans et al. |
| 2001/0010261 A1 | 8/2001 | Oomura et al. |
| 2001/0013409 A1 | 8/2001 | Burk |
| 2001/0015070 A1 | 8/2001 | Junichiro |
| 2002/0020183 A1 | 2/2002 | Hayashi |
| 2002/0026801 A1 | 3/2002 | Yamashita |
| 2002/0036081 A1 | 3/2002 | Ito et al. |
| 2002/0042248 A1 | 4/2002 | Vincent et al. |
| 2002/0078700 A1 | 6/2002 | Kelm et al. |
| 2002/0078705 A1 | 6/2002 | Schlosser |
| 2002/0084769 A1 | 7/2002 | Iritani et al. |
| 2002/0108384 A1 | 8/2002 | Higashiyama |
| 2002/0112489 A1 | 8/2002 | Egawa et al. |
| 2002/0157412 A1 | 10/2002 | Iwanami et al. |
| 2002/0157413 A1 | 10/2002 | Iwanami et al. |
| 2003/0041603 A1 | 3/2003 | Tada et al. |
| 2003/0105567 A1 | 6/2003 | Koenig et al. |
| 2003/0106332 A1 | 6/2003 | Okamoto |
| 2004/0060312 A1 | 4/2004 | Horn et al. |
| 2004/0079098 A1 | 4/2004 | Uno et al. |
| 2004/0112074 A1 | 6/2004 | Komura et al. |
| 2004/0168449 A1 | 9/2004 | Homan et al. |
| 2004/0216477 A1 | 11/2004 | Yamasaki et al. |
| 2004/0221599 A1 | 11/2004 | Hille et al. |
| 2004/0250560 A1 | 12/2004 | Ikura et al. |
| 2004/0256082 A1 | 12/2004 | Bracciano |
| 2005/0016196 A1 | 1/2005 | Kadle et al. |
| 2005/0109499 A1 | 5/2005 | Iwanami et al. |
| 2005/0161211 A1 | 7/2005 | Zeigler et al. |
| 2005/0230096 A1 | 10/2005 | Yamaoka |
| 2005/0235660 A1 | 10/2005 | Pham |
| 2005/0257545 A1 | 11/2005 | Ziehr et al. |
| 2006/0042284 A1 | 3/2006 | Heberle et al. |
| 2006/0080980 A1 | 4/2006 | Lee et al. |
| 2006/0102333 A1 | 5/2006 | Zeigler et al. |
| 2006/0118290 A1 | 6/2006 | Klassen et al. |
| 2006/0151163 A1 | 7/2006 | Zeigler et al. |
| 2006/0151164 A1 | 7/2006 | Zeigler et al. |
| 2006/0254309 A1 | 11/2006 | Takeuchi et al. |
| 2006/0277936 A1 | 12/2006 | Norden et al. |
| 2007/0039336 A1 | 2/2007 | Wu |
| 2007/0070605 A1 | 3/2007 | Straznicky et al. |
| 2007/0101760 A1 | 5/2007 | Bergander |
| 2007/0103014 A1 | 5/2007 | Sumiya et al. |
| 2007/0117167 A1* | 5/2007 | Malinowski ........ C07K 14/4738 435/7.23 |
| 2007/0131408 A1 | 6/2007 | Zeigler et al. |
| 2007/0144723 A1 | 6/2007 | Aubertin et al. |
| 2007/0144728 A1 | 6/2007 | Kinmartin et al. |
| 2007/0163276 A1 | 7/2007 | Braun et al. |
| 2007/0227167 A1 | 10/2007 | Shapiro |
| 2007/0251256 A1 | 11/2007 | Pham |
| 2007/0295017 A1 | 12/2007 | Pannell |
| 2008/0017347 A1 | 1/2008 | Chung et al. |
| 2008/0110185 A1 | 5/2008 | Veettil et al. |
| 2008/0156887 A1 | 7/2008 | Stanimirovic |
| 2008/0196436 A1 | 8/2008 | Connell |
| 2008/0196877 A1 | 8/2008 | Zeigler et al. |
| 2008/0209924 A1 | 9/2008 | Yoon et al. |
| 2008/0295535 A1 | 12/2008 | Robinet |
| 2009/0140590 A1 | 6/2009 | Hung |
| 2009/0211280 A1 | 8/2009 | Alston |
| 2009/0229288 A1 | 9/2009 | Alston et al. |
| 2009/0241592 A1 | 10/2009 | Stover |
| 2009/0249802 A1 | 10/2009 | Nemesh et al. |
| 2009/0301702 A1 | 12/2009 | Zeigler et al. |
| 2010/0009620 A1 | 1/2010 | Kawato et al. |
| 2010/0019047 A1 | 1/2010 | Flick |
| 2010/0127591 A1 | 5/2010 | Court et al. |
| 2010/0186433 A1* | 7/2010 | Galante ................. F04C 29/04 62/115 |
| 2010/0218530 A1 | 9/2010 | Melbostad et al. |
| 2010/0263395 A1 | 10/2010 | Adachi et al. |
| 2010/0293966 A1 | 11/2010 | Yokomachi |
| 2010/0297517 A1 | 11/2010 | Maier |
| 2011/0000240 A1 | 1/2011 | Yamada |
| 2011/0088417 A1 | 4/2011 | Kayser |
| 2011/0120146 A1 | 5/2011 | Ota et al. |
| 2011/0126566 A1 | 6/2011 | Jones et al. |
| 2011/0174014 A1 | 7/2011 | Scarcella et al. |
| 2011/0308265 A1 | 12/2011 | Phannavong |
| 2012/0023982 A1 | 2/2012 | Berson et al. |
| 2012/0047930 A1 | 3/2012 | Uselton |

(56) References Cited

U.S. PATENT DOCUMENTS

| | | | |
|---|---|---|---|
| 2012/0102779 A1 | 5/2012 | Beers et al. | |
| 2012/0118532 A1 | 5/2012 | Jentzsch et al. | |
| 2012/0133176 A1 | 5/2012 | Ramberg | |
| 2012/0247135 A1 | 10/2012 | Fakieh | |
| 2012/0297805 A1 | 11/2012 | Kamada et al. | |
| 2012/0318014 A1 | 12/2012 | Huff et al. | |
| 2013/0040549 A1 | 2/2013 | Douglas et al. | |
| 2013/0091867 A1 | 4/2013 | Campbell et al. | |
| 2013/0145781 A1 | 6/2013 | Liu | |
| 2013/0167577 A1 | 7/2013 | Street | |
| 2013/0181556 A1 | 7/2013 | Li et al. | |
| 2013/0195678 A1* | 8/2013 | Yoo | F04D 27/0269 417/45 |
| 2013/0298583 A1 | 11/2013 | O'Donnell | |
| 2013/0319630 A1 | 12/2013 | Yamamoto | |
| 2014/0066572 A1 | 3/2014 | Corveleyn | |
| 2014/0075970 A1 | 3/2014 | Benson | |
| 2014/0075973 A1 | 3/2014 | Graaf et al. | |
| 2014/0102679 A1 | 4/2014 | Matsudaira et al. | |
| 2014/0223939 A1 | 8/2014 | Nasuta | |
| 2014/0241926 A1* | 8/2014 | Fraser | F04C 29/021 418/55.1 |
| 2014/0245770 A1 | 9/2014 | Chen | |
| 2014/0260358 A1 | 9/2014 | Leete et al. | |
| 2014/0260403 A1 | 9/2014 | Connell | |
| 2014/0290299 A1 | 10/2014 | Nakaya | |
| 2014/0291411 A1 | 10/2014 | Tamaki | |
| 2015/0059367 A1 | 3/2015 | Emo et al. | |
| 2015/0064639 A1 | 3/2015 | Dumbreck | |
| 2015/0158368 A1 | 6/2015 | Herr-Rathke et al. | |
| 2015/0202986 A1 | 7/2015 | Hatakeyama | |
| 2015/0210287 A1 | 7/2015 | Penilla et al. | |
| 2015/0236525 A1 | 8/2015 | Aridome | |
| 2015/0239365 A1 | 8/2015 | Hyde et al. | |
| 2015/0306937 A1 | 10/2015 | Kitamura et al. | |
| 2015/0330675 A1 | 11/2015 | Tamaki | |
| 2016/0089958 A1 | 3/2016 | Powell | |
| 2016/0144685 A1 | 5/2016 | Ochiai et al. | |
| 2016/0146554 A1 | 5/2016 | Bhatia et al. | |
| 2016/0159199 A1 | 6/2016 | Kuroda | |
| 2016/0229266 A1 | 8/2016 | Maeda et al. | |
| 2017/0067676 A1 | 3/2017 | Munk et al. | |
| 2017/0211829 A1 | 7/2017 | Slack | |
| 2017/0211855 A1* | 7/2017 | Fraser | F04B 49/08 |
| 2017/0350632 A1 | 12/2017 | Hirao | |
| 2018/0001731 A1 | 1/2018 | Vehr | |

FOREIGN PATENT DOCUMENTS

| | | |
|---|---|---|
| CN | 201872573 U | 6/2011 |
| CN | 102398496 A | 4/2012 |
| CN | 103547466 A | 1/2014 |
| CN | 104105610 A | 10/2014 |
| CN | 105071563 A | 11/2015 |
| CN | 105186726 A | 11/2015 |
| DE | 4440044 A1 | 5/1996 |
| DE | 197 45 028 A1 | 4/1999 |
| DE | 199 17 811 A1 | 3/2000 |
| DE | 10014483 A1 | 11/2000 |
| DE | 199 42 029 A | 3/2001 |
| DE | 199 54 308 A1 | 7/2001 |
| DE | 102005004950 A1 | 8/2006 |
| DE | 10 2007 028851 A1 | 12/2008 |
| DE | 102010054965 A1 | 6/2012 |
| DE | 10 2012 022564 A1 | 5/2014 |
| DE | 11 2015 000552 | 11/2016 |
| EP | 0516413 A1 | 12/1992 |
| EP | 0958952 A1 | 11/1999 |
| EP | 1024038 A2 | 8/2000 |
| EP | 1 400 764 A1 | 3/2004 |
| EP | 1 477 748 A1 | 11/2004 |
| EP | 1 700 725 A1 | 9/2006 |
| EP | 1 703 231 A1 | 9/2006 |
| EP | 1 970 651 A1 | 9/2008 |
| EP | 2048011 A1 | 4/2009 |
| EP | 2196748 A2 | 6/2010 |
| EP | 2320160 A1 | 5/2011 |
| EP | 2620723 A2 * | 7/2013 | ............ F04B 35/045 |
| EP | 2894420 A1 | 7/2015 |
| EP | 0963895 A2 | 12/2015 |
| EP | 3118035 A1 | 1/2017 |
| FR | 2966391 A1 | 4/2012 |
| JP | H02-128915 A | 5/1990 |
| JP | 5032121 A | 2/1993 |
| JP | H07186711 A | 7/1995 |
| JP | H97-76740 A | 3/1997 |
| JP | H09318177 A | 12/1997 |
| JP | H10281595 A | 10/1998 |
| JP | 2000108651 A | 4/2000 |
| JP | 2005044551 A | 4/2000 |
| JP | 2002081823 A | 3/2002 |
| JP | 2005-033941 A | 2/2005 |
| JP | 2005-081960 A | 3/2005 |
| JP | 2006-264568 A | 10/2006 |
| JP | 2008220043 A | 9/2008 |
| JP | 2012017029 A | 1/2012 |
| JP | 2014226979 A | 12/2014 |
| KR | 20090068136 A | 6/2009 |
| WO | WO 89/09143 A1 | 10/1989 |
| WO | WO 99/61269 | 12/1999 |
| WO | WO 00/00361 | 1/2000 |
| WO | WO 2004/011288 A1 | 2/2004 |
| WO | WO 2006/082082 A1 | 8/2006 |
| WO | WO 2012/158326 A1 | 11/2012 |
| WO | WO 2013/113308 A1 | 8/2013 |
| WO | WO 2014/112320 A1 | 7/2014 |
| WO | WO 2014/180749 A1 | 11/2014 |
| WO | WO 2014/209780 A1 | 12/2014 |
| WO | WO 2015/076872 A1 | 5/2015 |

OTHER PUBLICATIONS

Anonymous: "Nite Connected Climate Controlled Transport Monitoring/ Mobile Internet of Things UI Design/Mobil UI: Progress/Printeres/ Internet of Things, User Inter . . . ," Oct. 19, 2016 retrieved from: URL:htps://za.pinterest.com/pin/192810427773981541/, 1 pg.

Bergstrom, Inc., International Search Report and Written Opinion, PCT/US2014/026687, Jul. 28, 2014, 12 pgs.

Bergstrom, Inc., International Preliminary Report on Patentability, PCT/US2014/026687, Sep. 15, 2015, 7 pgs.

Bergstrom, Inc., International Search Report and Written Opinion, PCT/US2014/026683, Jul. 3, 2014 12 pgs.

Bergstrom, Inc., International Preliminary Report on Patentability, PCT/US2014/026683, Sep. 15, 2015, 6 pgs.

Bergstrom, Inc., International Search Report and Written Opinion, PCT/US2013/068331, Nov. 7, 2014, 9 pgs.

Bergstrom, Inc., International Preliminary Report on Patentability, PCT/US2013/068331, May 10, 2016, 6 pgs.

Bergstrom, Inc., International Search Report and Written Opinion, PCT/US2016/021602, Nov. 3, 2016, 7 pgs.

Bergstrom, Inc., International Preliminary Report on Patentability, PCT/US2016/021602, Sep. 12, 2017 , 11 pgs.

Bergstrom, Inc., International Search Report and Written Opinion, PCT/US2017/021346, Jul. 25, 2017, 11 pgs.

Bergstrom, Inc., International Search Report and Written Opinion, PCT/US2016/065812, Mar. 22, 2017, 12 pgs.

Bergstrom, Inc., International Preliminary Report on Patentability, PCT/US2016/065812, Jun. 12, 2018, 8 pgs.

Bergstrom, Inc., International Search Report and Written Opinion, PCT/US2018/044093, Oct. 25, 2018, 13 pgs.

Bergstrom, Inc., International Search Report and Written Opinion, PCT/US2017049859, Nov. 12, 2017, 4 pgs.

Bergstrom, Inc., International Preliminary Report on Patentability, PCT/US2017049859, Mar. 5, 2019, 6 pgs.

Bergstrom, Inc., International Search Report and Written Opinion PCT/US2017053196, Sep. 3, 2018, 17 pgs.

Bergstrom, Inc., International Preliminary Report on Patentability, PCT/US2017053196, Apr. 2, 2019, 11 pgs.

(56) References Cited

OTHER PUBLICATIONS

Bergstrom, Inc., International Search Report and Written Opinion PCT/US2016/423326, Sep. 27, 2016, 8 pgs.
Bergstrom, Inc., International Preliminary Report on Patentability PCT/US2016/423326, Jan. 16, 2018, 7 pgs.
Bergstrom, Inc., International Search Report and Written Opinion PCT/US2016/42307, Oct. 7, 2016, 8 pgs.
Bergstrom, Inc., International Preliminary Report on Patentability PCT/US2016/42307, Jan. 16, 2018, 7 pgs.
Bergstrom, Inc., International Search Report and Written Opinion PCT/US2016/42314, Sep. 30, 2016, 7 pgs.
Bergstrom, Inc., International Preliminary Report on Patentability, PCT/US2016/42314, Jan. 16, 2018, 6 pgs.
Bergstrom, Inc., International Search Report and Written Opinion PCT/US2016/42329, Sep. 30, 2016, 6 pgs.
Bergstrom, Inc., International Preliminary Report on Patentability PCT/US2016/42329, Jan. 16, 2018, 5 pgs.
Bergstrom, Inc., Communication Pursuant to Rules 161(2) and 162 EPC, EP14717604.4, Oct. 23, 2015, 2 pgs.
Bergstrom, Inc., Communication Pursuant to Article 94(3), EP14717604.4, Jun. 2, 2017, 12 pgs.
Bergstrom, Inc., Communication Pursuant to Article 94(3), EP14717604.4, Feb. 4, 2019, 5 pgs.
Bergstrom, Inc., Communication Pursuant to Rules 161(2) and 162 EPC, EP14722438.0, Nov. 2, 2015. 2 pgs.
Bergstrom, Inc. Communication Pursuant to Article 94(3), EP14722438.0, Jan. 24, 2018, 5 pgs.
Bergstrom, Inc., Communication Pursuant to Rules 161(2) and 162 EPC, EP13795064.8, Jun. 22, 2016, 2 pgs.
Bergstrom, Inc. Extended European Search Report, EP16204254.3, Jul. 25, 2017, 8 pgs.
Bergstrom, Inc. Partial European Search Report, EP16204259.2, May 30, 2017, 14 pgs.
Bergstrom, Inc. Extended European Search Report, EP16204259.2, Oct. 25, 2017, 15 pgs.
Bergstrom, Inc. Corrected Extended European Search Report, EP16204259.2, Nov. 24, 2017, 15 pgs.
Bergstrom, Inc. Partial European Search Report, EP16204256.8, Jul. 13, 2017, 14 pgs.
Bergstrom, Inc. Extended European Search Report, EP16204256.8, Jan. 12, 2018, 11 pgs.
Bergstrom, Inc. Extended European Search Report, EP16204256.8, Dec. 1, 2017, 13 pgs.
Bergstrom, Inc. Extended European Search Report, EP16204267.5, Jul. 11, 2017, 8 pgs.
Bergstrom, Inc., Communicaton Pursuant to Article 94(3), EP16820096.2, Aug. 12, 2019, 7 pgs.
Bergstrom, Inc. Extended European Search Report, EP18177850.7, Nov. 28, 2018. 8 pgs.
Bergstrom, Inc., Communication Pursuant to Rules 161(1) and 162, EP17780954.8, May 10, 2019, 3 pgs.
Bergstrom, Inc., Extended European Search Report, EP19166779.9, Aug. 30, 2019, 8 pgs.
Bergstrom, Inc., Office Action, CN201480027137.4, received Mar. 3, 2017, 15 pgs.
Bergstrom, Inc., 2nd Office Action, CN201480027137.4, Jul. 13, 2017, 10 pgs.
Bergstrom, Inc., 3rd Office Action, CN201480027137.4, Jan. 17, 2018, 19 pgs.
Bergstrom, Inc., 4th Office Action, CN201480027137.4, Jul. 26, 2018, 8 pgs.
Bergstrom, Inc., Notification of Grant, CN201480027137.4, Feb. 21, 2019, 1 pg.
Bergstrom, Inc., Patent Certificate CN201480027137.4, May 31, 2019, 4 pgs.
Bergstrom, Inc., Office Action, CN201480027117.7, received Mar. 9, 2017, 8 pgs.
Bergstrom, Inc., Patent Certificate, CN201480027117.7, Nov. 21, 2017, 3 pgs.
Bergstrom, Inc., 2nd Office Action, CN201380081940.1, Jan. 17, 2018, 13 pgs.
Bergstrom, Inc., 3rd Office Action, CN201380081940.1, Jul. 31, 2018, 7 pgs.
Bergstrom, Inc., 1st Office Action, CN201680002224.3, Dec. 11, 2018, 5 pgs.
Bergstrom, Inc., Letters Patent, CN201680002224.3, Sep. 10, 2019, 2 pgs.
Connell, Office Action, U.S. Appl. No. 14/209,877, Nov. 27, 2015, 19 pgs.
Connell, Final Office Action, U.S. Appl. No. 14/209,877, Jun. 22, 2016, 17 pgs.
Connell, Office Action, U.S. Appl. No. 14/209,877, Dec. 29, 2016, 21 pgs.
Connell, Notice of Allowance, U.S. Appl. No. 14/209,877, May 16, 2017, 5 pgs.
Connell, Notice of Allowance, U.S. Appl. No. 14/209,877, Aug. 4, 2017, 7 pgs.
Connell, Office Action, U.S. Appl. No. 14/209,961, Dec. 2, 2015, 14 pgs.
Connell, Final Office Action, U.S. Appl. No. 14/209,961, Jul. 25, 2016, 15 pgs.
Connell, Notice of Allowance, U.S. Appl. No. 14/209,961, Jun. 15, 2017, 10 pgs.
Connell, Notice of Allowance, U.S. Appl. No. 15/064,552, Jun. 1, 2017, 9 pgs.
Connell, Notice of Allowance, U.S. Appl. No. 14/995,119, Aug. 31, 2017, 7 pgs.
Connell, Office Action, U.S. Appl. No. 14/965,142, Aug. 29, 2017, 12 pgs.
Connell, Notice of Allowance, U.S. Appl. No. 14/965,142, Feb. 26, 2018, 8 pgs.
Connell, Office Action, U.S. Appl. No. 15/280,876, Dec. 14, 2017, 23 pgs.
Connell, Notice of Allowance, U.S. Appl. No. 15/280,876, Jun. 21, 2018, 9 pgs.
Connell, Office Action, U.S. Appl. No. 15/791,243, May 8, 2018, 12 pgs.
Connell, Office Action, U.S. Appl. No. 15/065,745, May 31, 2018, 44 pgs.
Connell, Final Office Action, U.S. Appl. No. 15/065,745, Dec. 17, 2018, 27 pgs.
Connell, Office Action, U.S. Appl. No. 15/065,745, May 9, 2019, 28 pgs.
Connell, Notice of Allowance, U.S. Appl. No. 15/065,745, Nov. 14, 2019, 9 pgs.
Connell, Office Action, U.S. Appl. No. 15/283,150, Sep. 27, 2018, 21 pgs.
Connell, Notice of Allowance, U.S. Appl. No. 15/283,150, Mar. 22, 2019, 8 pgs.
Connell, Office Action, U.S. Appl. No. 16/894,728, May 26, 2021, 7 pgs.
Connell, Notice of Allowance, U.S. Appl. No. 16/894,728, Sep. 22, 2021, 8 pgs.
Connell, Office Action, Oct. 19, 2018, U.S. Appl. No. 15/722,860, 7 pgs.
Connell, Notice of Allowance, Feb. 7, 2019, U.S. Appl. No. 15/722,860, 5 pgs.
Connell, Notice of Allowance, May 20, 2019, U.S. Appl. No. 15/722,860, 5 pgs.
Connell, Notice of Allowance, U.S. Appl. No. 16/546,141, Dec. 2, 2020, 5 pgs.
Connell, Notice of Allowance, U.S. Appl. No. 15/791,243, Jan. 24, 2019, 7 pgs.
Connell, Notice of Allowance, U.S. Appl. No. 15/791,243, May 15, 2019, 7 pgs.
Connell, Office Action, Apr. 18, 2019, U.S. Appl. No. 15/816,993, 17 pgs.
Connell, Notice of Allowance, Sep. 26, 2019, U.S. Appl. No. 15/816,993, 8 pgs.
Connell, Office Action, U.S. Appl. No. 15/439,865, Sep. 24, 2019, 6 pgs.

(56) References Cited

OTHER PUBLICATIONS

Connell, Notice of Allowance, U.S. Appl. No. 15/439,865, Jan. 30, 2020, 8 pgs.
Connell, Office Action, U.S. Appl. No. 15/660,734, Oct. 30, 2019, 24 pgs.
Connell, Notice of Allowance, U.S. Appl. No. 15/660,734, Mar. 9, 2020, 8 pgs.
Connell, Office Action, U.S. Appl. No. 16/941,495, Feb. 1, 2022, 12 pgs.
Connell, Notice of Allowance, U.S. Appl. No. 16/941,495, Jul. 5, 2022, 8 pgs.
Connell, Office Action, U.S. Appl. No. 17/560,216, Nov. 21, 2022, 10 pgs.
Connell, Notice of Allowance, U.S. Appl. No. 17/560,216, Mar. 9, 2023, 8 pgs.
Connell, Office Action, U.S. Appl. No. 17/224,052, Feb. 6, 2023, 8 pgs.
Connell, Notice of Allowance, U.S. Appl. No. 17/224,052, Jun. 2, 2023, 5 pgs.
Connell, Notice of Allowance, U.S. Appl. No. 16/922,855, Jun. 20, 2022, 8 pgs.
Connell, Office Action, U.S. Appl. No. 18/071,517, Jul. 7, 2023, 18 pgs.
FlatPlate Heat Exchangers; GEA FlatPiate Inc.; website—http://www.flatplate.com/profile.html; date last visited Aug. 9, 2007; 3 pages.
Glacier Bay Inc., Glacier Bay's Home Page, page printed from a website, htt(?:i/web.archive.org/web/19990417062255/htt[2://www.glacierbay.com/, apparent archive date: Apr. 17, 1999, 1 page.
Glacier Bay Inc., Darpa/Glacier Bay ECS, pages printed from a website, httir//web.archive.org/web/19991104132941/wvvw.glacierbay.com/darQatxt.htm, apparent archive date: Nov. 4, 1999, 2 pages.
Glacier Bay Inc., Glacier Bay ECS DARPA Project—Final Report, pages printed from a website, httn://web.archive.or_gjweb/19991103001512/v•vww,_g.Jacierbay.com/Darnhtm.htm, apparent archive date: Nov. 3, 1999, 9 pages.
Glacier Bay Inc., Glacier Bay ECS DARPA Project—Project Photos, pages printed from a website, httg://web.archive.org/web/1999"1103012854/www.glacierbay.com/Dargghotos.htm, apparent archive date: Nov. 3, 1999, 2 pages.
Glacier Bay Inc., Glacier Bay ECS DARPA Project—Operational Video, page printed from a website, httQ://web.archive.org/web/19991022221040/wvvw.qlacierbay.com/DarQvid.htm, apparent archive date Oct. 22, 1999; 1 page.
Glacier Bay Inc., R & D, pages printed from a website, htt ://web.archive.org/web/20000121130306/www.glacierbay.com/R&D.htm, apparent archive date: Jan. 21, 2000, 2 pages.
Glacier Bay Inc., Company History, pages printed from a website, httg://web.archive.org/web/20000301153828/www.g!acierbay.corn/History:.htrn, apparent archive date: Mar. 1, 2000; 2 pages.
Glacier Bay Inc., Contact, page printed from a website, httQ://web.archive.orq/web/19990508104511/W\'"I!V.qlacierba:t.com/Contact.htm, apparent archive date: May 8, 1999; 1 page.
Hansson, Office Action Oct. 5, 2018, U.S. Appl. No. 15/256,109, 14 pgs.
Hansson, Final Office Action, U.S. Appl. No. 15/256,109, May 2, 2019, 14 pgs.
Hansson, Notice of Allowance, U.S. Appl. No. 15/256,109, Sep. 24, 2019, 9 pgs.
Michael Löhle, Günther Feuerecker and Ulrich Salzer; Non Idling HVAC-modufe tor Long Distance Trucks;SAE TechnicalPaper Series 1999-01-1193; International Congress and Exposition, Detroit, Michigan; Mar. 1-4, 1999; 8 pages.
Mahmoud Ghodbane; On Vehicle Performance of a Secondary Loop A/C System; SAE Technical Paper Series 2000-01-1270; SAE 2000 World Congress, Detroit, Michigan; Mar. 6-9, 2000; 6 pages.
Masami Konaka and Hiroki Matsuo; SAE Technical Paper Series 2000-01-1271; SAE 2000 World Congress, Detroit, Michigan; Mar. 6-9, 2000; 6 pages.
Mayo Mayo, Office Action, U.S. Appl. No. 15/034,517, Feb. 21, 2018, 22 pgs.
Mayo Mayo, Final Office Action, U.S. Appl. No. 15/034,517, Aug. 28, 2018, 9 pgs.
Mayo Mayo, Final Office Action, U.S. Appl. No. 15/034,517, Nov. 30, 2018, 7 pgs.
Frank Stodolsky, Linda Gaines, and Anant Vyas; Analysis of Technology Options to Reduce the Fuel Consumption of Idling Trucks; Paper-Center for Transportation Research, Energy Systems Division, Argonne National Laboratory,9700 South Cass Avenue, Argonne, Illinois 60439;Jun. 2000; 30 pages.
Paper No. 26 in IPR2012-00027, Jun. 11, 2013, 12 pgs. (U.S. Pat. No. 7,591,303).
Patricia Gardie and Vincent Goetz; Thermal Energy Storage System by Solid Absorption for Electric Automobile Heating and Air-Conditioning; Paper; 5 pages.
TropiCool No-idle Heating & Cooling, 110V/12V High-efficiency, Self-contained, Electrified Heating/AC System; ACC Climate Control Brochure, Elkhart, Indiana; 205, 1 page.
TropiCool Power Plus, More comfort. More efficiency. More options.; ACC Climate Control Brochure, Elkhart, Indiana; 2006, 3 pages.
Tyco Electronics Corporation, "Mag-Mate Connector with Multispring Pin," Datasheet, 2013, pp. 1-2 from <URL: http://datasheet.octopart.com/1247003-2-TE-Connectivity-datasheet-14918754.pdf>.
Packless Industries, the leader in refrigerant to water coaxial heat exchangers, flexible hoses and sucti . . . ; website—http://www.packless.com/profile.htmle: date last visited Aug. 9, 2007; 1 page.
Xei, Office Action, U.S. Appl. No. 16/370,741, Jun. 29, 2021, 17 pgs.
Xie, Final Office Action, U.S. Appl. No. 16/370,741, Dec. 1, 2021, 7 pgs.
Xei, Notice of Allowance, U.S. Appl. No. 16/370,741, Apr. 18, 2022, 8 pgs.
Xei, Office Action, U.S. Appl. No. 17/894,106, Jun. 23, 2023, 10 pgs.
Xei, Office Action, U.S. Appl. No. 17/894,106, Nov. 8, 2023, 7 pgs.
Zeigler, Office Action, U.S. Appl. No. 13/661,519, Mar. 11, 2013, 8 pgs.
Zeigler, Final Office Action, U.S. Appl. No. 13/661,519, Sep. 18, 2013, 15 pgs.
Zeigler, Office Action, U.S. Appl. No. 13/661,519, Apr. 9, 2014, 20 pgs.
Zeigler, Final Office Action, U.S. Appl. No. 13/661,519, Sep. 26, 2014, 23 pgs.
Zeigler, Office Action, U.S. Appl. No. 13/661,519, Oct. 28, 2015, 20 pgs.
Zeigler, Notice of Allowance, U.S. Appl. No. 13/661,519, Jun. 17, 2016, 8 pgs.
Zeigler, Office Action, U.S. Appl. No. 16/046,711, Feb. 6, 2020, 17 pgs.
Zeigler, Final Office Action, U.S. Appl. No. 16/046,711, Jul. 23, 2020, 17 pgs.
Zeigler, Advisory Action, U.S. Appl. No. 16/046,711, Oct. 27, 2020, 5 pgs.
Zeigler, Office Action, U.S. Appl. No. 16/046,711, Aug. 31, 2021, 16 pgs.
Zeigler, Office Action, U.S. Appl. No. 17/948,999, May 1, 2023, 24 pgs.
Zeigler, Notice of Allowance, U.S. Appl. No. 17/948,999, Dec. 22, 2023, 6 pgs.
Connell, Office Action, U.S. Appl. No. 18/071,517, Aug. 26, 2024, 16 pgs.
Connell, Notice of Allowance, U.S. Appl. No. 18/324,090, Aug. 6, 2024, 9 pgs.
Connell, Final Office Action, U.S. Appl. No. 18/475,062, Sep. 5, 2024, 5 pgs.

* cited by examiner

MULTI-COMPRESSOR OIL MIGRATION MITIGATION CLIMATE SYSTEM

RELATED APPLICATIONS

This application is a continuation-in-part of U.S. application Ser. No. 16/922,855, filed Jul. 7, 2020, entitled "Multi-Compressor Climate System," which is a continuation of U.S. application Ser. No. 16/133,599, filed Sep. 17, 2018, now U.S. Pat. No. 10,703,173, entitled "Multi-Compressor Climate System," which is a continuation of U.S. application Ser. No. 15/280,876, filed Sep. 29, 2016, now U.S. Pat. No. 10,081,226, entitled "Parallel Compressors Climate System," which claims priority to U.S. Provisional Application Ser. No. 62/378,135, filed Aug. 22, 2016, entitled "Parallel Compressors Climate System," each of which is incorporated by reference herein in its entirety.

This application also claims priority to U.S. Provisional Application Serial No. 63/347,544, filed May 31, 2022, entitled "Multi-Compressor Oil Migration Mitigation Climate System," which is also incorporated by reference herein in its entirety.

FIELD OF THE INVENTION

The present disclosure generally relates to climate systems and control methods therefor, and more particularly, to vehicle climate systems that use multiple compressors and control methods that can draw-back compressor oil to the compressors without the use of an oil equalization system.

BACKGROUND

It is well known that nearly all compressors require a form of lubricant (e.g., oil) to cool, seal, or lubricate internal components. Typically, only static jet compressors and oil-free machines with rotors suspended in magnetic or air bearings are exempt from the need for some type of lubrication. In refrigeration systems that use compressors, a small portion of the compressor lubricant becomes entrained with the refrigerant and discharged from the compressor. The lubricant entrained in the refrigerant may cause several problems. For example, in a system with a single compressor, if too much lubricant is entrained in the refrigerant, the heat transfer and efficiency of the condenser and evaporator may be significantly reduced. In a system with two or more compressors, in addition to affecting heat transfer and efficiency of the condenser and evaporator, the entrained lubricant may not be returned to both compressors equally or properly, thereby providing too much lubricant to one compressor and too little to the other. This problem is exacerbated when the compressors are arranged in parallel.

Some conventional systems address this by using an oil equalization line system that connects the compressor crankcases or oil sumps via an oil equalization line. This approach usually requires the compressors having the same size and the same capacity and mounted at the same level or height. Other conventional systems use oil separators (either individual or common separators) to separate oil from the refrigerant and then return the separated oil back to the compressors. These systems are inherently complicated, more expensive and/or difficult to maintain and control.

Given the above background, there is a need in the art for climate systems and control methods that are simple, less expansive and/or easy to control and at the same time can realize the benefits of the parallel compressor configuration.

Additionally, in climate control systems that use multiple low-side components (i.e. compressors, evaporators, chillers, etc.), compressor oil can migrate and become trapped in dormant components, therefore reducing lubrication capability of the system. As such, systems that mitigate the transfer of compressor oil are needed.

The information disclosed in this Background section is provided solely to provide a general background of the embodiments described herein and is not an acknowledgement or suggestion that this information forms part of the prior art already known to a person skilled in the art.

SUMMARY

Various aspects of the present disclosure provide climate systems and control methods that are simple to make and operate, are less expensive, and easier to control, while at the same time realizing the benefits of a parallel compressor configuration.

In one embodiment, a climate system for cooling a compartment of a vehicle is provided. The climate system includes a plurality of compressors, a condenser, an evaporator, refrigerant lines and a controller. The plurality of compressors is arranged in parallel for compressing refrigerant into a compressed refrigerant. The condenser is disposed downstream of the plurality of compressors for condensing the compressed refrigerant. The evaporator is disposed downstream of the condenser for evaporating the condensed refrigerant. The evaporator is thermally coupled to the compartment of the vehicle to cool the compartment. The refrigerant lines fluidly connect the plurality of compressors, the condenser, and the evaporator to form a refrigerant circuit for circulating the refrigerant. The controller is electrically coupled to the first and second compressors and configured to automatically and independently control operation of the first and second compressors to draw back compressor oil to the first and second compressors.

The plurality of the compressors includes a first compressor and a second compressor. In one embodiment, at least one of the first compressor and the second compressor is a twin rotary vane compressor. In another embodiment, one of the first compressor and the second compressor is a single rotary vane compressor. The first compressor includes a first refrigerant inlet, a first refrigerant outlet, and a first oil sump. The second compressor includes a second refrigerant inlet, a second refrigerant outlet, and a second oil sump. The first refrigerant inlet of the first compressor is fluidly connected to the second refrigerant inlet of the second compressor. The first refrigerant outlet of the first compressor is fluidly connected to the second refrigerant outlet of the second compressor. The first oil sump is independent of the second oil sump. In one embodiment, the first oil sump of the first compressor is independent of the second oil sump of the second compressor in that the first oil sump of the first compressor is not fluidly connected to the second oil sump of the second compressor. In another embodiment, the first oil sump of the first compressor is independent of the second oil sump of the second compressor in that the first oil sump and the second oil sump are not connected by an oil equalizing system.

In some embodiments, the controller automatically controls operations of the plurality of the compressors to draw back compressor oil to the compressors. In an embodiment, the controller operates the first compressor at a first low speed range for a first low-speed time period before turning off the first compressor to allow compressor oil drawn back to the first oil sump. Operating the first compressor at the first low speed range for the first low-speed time period is performed every time when the first compressor is turned off, every other time when the first compressor is to be turned off, or after the first compressor has been operated at a first high speed range for a first high-speed time period. In an embodiment, the controller operates the second compressor at a second low speed range for a second low-speed time period before turning off the second compressor to allow the compressor oil drawn back to the second oil sump. Operating the second compressor at the second low speed range for the second low-speed time period is performed every time when the second compressor is to be turned off, every other time when the second compressor is to be turned off, or after the second compressor is operated at a second high speed range for a second high-speed time period.

In one embodiment, the climate system further includes a sensor for measuring an atmosphere temperature and a thermostat for receiving a desired temperature and detecting an interior temperature in the compartment. The controller is electrically coupled to the sensor and the thermostat and controls operations of the first and second compressors in accordance with the atmospheric temperature, the interior temperature and the desired temperature.

In one embodiment, the climate system further includes a first air blower and/or a second air blower. The first air blower is positioned proximate the condenser, and configured to do one or more of the following: blowing air over the condenser to cool the condenser, and vent interior air of the compartment to reduce the thermal load of the compartment. The second air blower is configured to suck in ambient or fresh air into the compartment of the vehicle, if the interior temperature exceeds both the desired temperature and the atmosphere temperature. The first and second air blowers can be operated simultaneously, alternately or independently. In some embodiments, the climate system is integrated with an existing air conditioning system of the vehicle in that the first air blower and/or the second air blower are shared by the climate system and the existing air conditioning system.

Another embodiment provides a first method for controlling a climate system. The first method includes: (a) receiving a desired temperature for the compartment and an atmosphere temperature outside of the vehicle; (b) monitoring an interior temperature in the compartment of the vehicle; (c) determining whether the interior temperature is higher than the desired temperature; (d) determining whether the interior temperature is higher than the atmosphere temperature; (e) turning on the first air blower to vent interior air in the compartment, if the interior temperature exceeds both the desired temperature and the atmosphere temperature; (f) determining whether the thermal load of the compartment exceeds a first thermal threshold, if the interior temperature is higher than the desired temperature but lower than or equal to the atmosphere temperature; (g) turning on the first compressor or the second compressor if the thermal load of the compartment is less than or equal to a first thermal threshold; and (h) turning on both the first compressor and the second compressor if the thermal load of the compartment exceeds the first thermal threshold.

In some embodiments, the first method further includes one or more additional or optional steps. In one embodiment, the first method includes: operating the first compressor at a first low speed range for a first low-speed time period before turning off the first compressor to allow compressor oil drawn back to the first oil sump; and/or operating the second compressor at a second low speed range for a second low-speed time period before turning off the second compressor to allow the compressor oil drawn back to the second oil sump. In some embodiments, operating the first compressor at the first low speed range for the first low-speed time period is performed every time when the first compressor is turned off, every other time when the first compressor is to be turned off, or after the first compressor has been operated at a first high-speed range for a first high-speed time period. Operating the second compressor at the second low speed range for the second low-speed time period is performed every time when the second compressor is to be turned off, every other time when the second compressor is to be turned off, or after the second compressor is operated at a second high speed range for a second high-speed time period.

In some embodiments, the first method includes: determining whether it is needed to draw back compressor oil to the first compressor based on whether the first compressor has been running at a first high speed range and for how long; and determining whether it is needed to draw back the compressor oil to the second compressor based on whether the second compressor has been running at a second high speed range and for how long. Based on the determination, the first method, in some embodiments, operates the first compressor at a first low speed range for a first low-speed time period to draw back compressor oil to the first compressor if the first compressor has been operated at the first high speed range for a first high-speed time period, and/or operates the second compressor at a second low speed range for a second low-speed time period to draw back compressor to the second compressor if it is determined that the second compressor has been operated at the second high speed range for a second high-speed time period.

In one embodiment, the first method further includes: turning on a second air blower installed in the vehicle to suck in ambient or fresh air into the compartment of the vehicle, if the interior temperature exceeds both the desired temperature and the atmosphere temperature. In another embodiment, the first method further includes: opening or closing a door in a duct of the existing air conditioning system of the vehicle before turning on the second air blower, wherein the opening or closing of the door allows the second air blower to blow the ambient or fresh air into the compartment of the vehicle.

Yet other embodiments provide a second method for controlling a climate system. The second method includes: (a) receiving a desired temperature for the compartment and an atmosphere temperature outside of the vehicle; (b) determining whether a thermal load of the compartment exceeds a first thermal threshold; (c) turning on the first compressor or the second compressor if the thermal load of the compartment is less than or equal to a first thermal threshold; (d) turning on both the first compressor and the second compressor if the thermal load of the compartment exceeds the first thermal threshold; and (e) performing one or more of the following: operating the first compressor at a first low speed range for a first low-speed time period before turning off the first compressor to allow compressor oil drawn back to the first oil sump; and operating the second compressor at a second low speed range for a second low-speed time period before turning off the second compressor to allow the compressor oil drawn back to the second oil sump.

In some embodiments, prior to operating the first and/or second compressor at a low speed range, the second method further includes one or more of the following additional or optional steps: determining whether it is needed to draw back compressor oil to the first compressor based on whether the first compressor has been running at a first high speed range and for how long; and determining whether it is needed to draw back the compressor oil to the second compressor based on whether the second compressor has been running at a second high speed range and for how long. After the determination, in some embodiments, the second method operates the first compressor at a first low speed range for a first low-speed time period to draw back compressor oil to the first compressor if the first compressor has been operated at the first high speed range for a first high-speed time period; and operates the second compressor at a second low speed range for a second low-speed time period to draw back compressor to the second compressor if it is determined that the second compressor has been operated at the second high speed range for a second high-speed time period.

In another embodiment, a specific refrigerant plumbing design has been developed to mitigate or prevent compressor oil from migrating into dormant components (e.g., inactive compressors) as well as low-side components of the climate system (e.g., an evaporator, a suction line, and any accessory components located within the suction line). A climate system for conditioning air within a compartment of a vehicle is disclosed. The climate system includes a refrigerant circuit, a first compressor (102; FIGS. 1, 2 and 8) fluidly coupled to the refrigerant circuit, a second compressor (104; FIGS. 1, 2 and 8) fluidly coupled to the refrigerant circuit. The first compressor including a first compressor inlet and a first compressor outlet, and the second compressor including a second compressor inlet and a second compressor outlet. The climate system further includes a first refrigerant-to-air heat exchanger (118; FIGS. 1 and 2) fluidly coupled to the first compressor outlet and the second compressor outlet via a first set of one or more refrigerant lines (e.g., 122-1, 122-2, 122-3; FIGS. 1, and 2). The first refrigerant-to-air heat exchanger is thermally coupled to an exterior of the vehicle and forms part of the refrigerant circuit. The climate system further includes a second refrigerant-to-air heat exchanger (120; FIGS. 1 and 2) (i) fluidly coupled to the first refrigerant-to-air heat exchanger via a second set of one or more refrigerant lines (e.g., 122-4) and (ii) fluidly coupled to the first compressor inlet and the second compressor inlet via a third set of one or more refrigerant lines (e.g., 122-5, 122-6, 122-7; FIGS. 1, and 2). The second refrigerant-to-air heat exchanger is thermally coupled to the compartment of the vehicle and forms part of the refrigerant circuit. A first refrigerant line of the third set of one or more refrigerant lines includes a first section (e.g., 122-6; FIGS. 1, 2, and 8) configured to cause any compressor oil mixed in the refrigerant to flow from a first lower elevation (e.g., 811; FIG. 8) to a first higher elevation (e.g., 813; FIG. 8) before flowing to the first compressor to restrict a flow of compressor oil to the first compressor when the first compressor is inactive. A second refrigerant line of the third set of one or more refrigerant lines includes a second section (e.g., 122-7; FIGS. 1, 2, and 8) configured to cause any compressor oil mixed in the refrigerant to flow from a second lower elevation (e.g., 811; FIG. 8) to a second higher elevation (e.g., 813; FIG. 8) before flowing to the second compressor to restrict a flow of compressor oil to the second compressor when the second compressor is inactive. The climate system further includes a controller (124; FIGS. 1 and 2) communicatively coupled to the first and second compressors and including instructions that are configured to selectively activating and deactivating the first and second compressors.

Additionally, the specific refrigerant plumbing design disclosed herein is configured to provide a consistent OCR level for a climate system. The consistent OCR level for a climate system can be any OCR level required for a particular climate system to operate efficiently (i.e., such that the heat transfer and efficiency of the condenser and evaporator are not significantly reduced) while also lubricating components of the climate system. For example, in some embodiments, the second compressor maintains a second predetermined oil circulation ratio (OCR) (e.g., between 3 percent to 8 percent) or an oil mass of greater than a second predetermined oil mass (e.g., 40 g) while the climate system is in operation; and the first compressor maintains a first predetermined OCR (e.g., between 3.5 percent to 8 percent). Additionally, in some embodiments, a starting and ending charge level of the first compressor is at least a first predetermined baseline oil mass (e.g. 135 g); and a starting and ending charge level of the second compressor is at least a second predetermined baseline oil mass (e.g., 150 g). Values of the first predetermined OCR, the second predetermined OCR, the second predetermined oil mass, the first predetermined baseline oil mass, and the second predetermined baseline oil mass are based on the configuration of the climate system and/or the one or more components of the climate system. The OCR percentage and oil amount requirements can be different for each climate system.

In some embodiments, the first compressor is configured to be driven by an internal combustion engine (e.g., a belt driven compressor or other mechanical compressor); and the second compressor is an electrically driven compressor. A skilled artisan will appreciate that any compressor drive combination can be used in the climate system between belt, electric, hydraulic, direct drive, etc.

In some embodiments, the first section of the first refrigerant line extends longitudinally from the first lower elevation to the first higher elevation at a first angle (e.g., angle $\alpha$) from a centerline of the first lower elevation. In some embodiments, the first angle is between 5 to 90 degrees. In some embodiments, the first angle is between 15 to 60 degrees. In some embodiments, the first angle is between 30 to 45 degrees. In some embodiments, the second section of the second refrigerant line extends longitudinally from the second lower elevation to the second higher elevation at a second angle ($\theta$) from a centerline of the second lower elevation. In some embodiments, the second angle is between 5 to 90 degrees. In some embodiments, the second angle is between 15 to 60 degrees. In some embodiments, the second angle is between 30 to 45 degrees. In some embodiments, the first angle and the second angle are the same. Alternatively, in some embodiments, the first and second angles are distinct.

In some embodiments, the first lower elevation is the same as the second lower elevation. Alternatively, in some embodiments, the first lower elevation is distinct from the second lower elevation. In some embodiments, the first higher elevation is the same as the second higher elevation. Alternatively, in some embodiments, the first higher elevation is distinct from the second higher elevation.

In some embodiments, the first compressor and the second compressor are coupled in parallel with one another. In some embodiments, the controller further includes instructions that are configured to selectively adjust operation of the first and second compressors. In some embodiments, selectively adjusting operation of the first and second compressors includes adjusting a speed of the first and/or second compressors. In some embodiments, the third set of refrigerant lines restricts the flow of compressor oil from the active compressor to the inactive compressor without adjustments, via the controller, to the operation of the first and second compressors.

The systems and methods of the present disclosure have other features and advantages that will be apparent from or are set forth in more detail in the accompanying drawings, which are incorporated herein, and the following Detailed Description.

BRIEF DESCRIPTION OF THE DRAWINGS

The accompanying drawings, which are incorporated into and constitute a part of this specification, illustrate one or more embodiments of the present application and, together with the detailed description, serve to explain the principles and implementations of the application.

DETAILED DESCRIPTION

Figure 1:
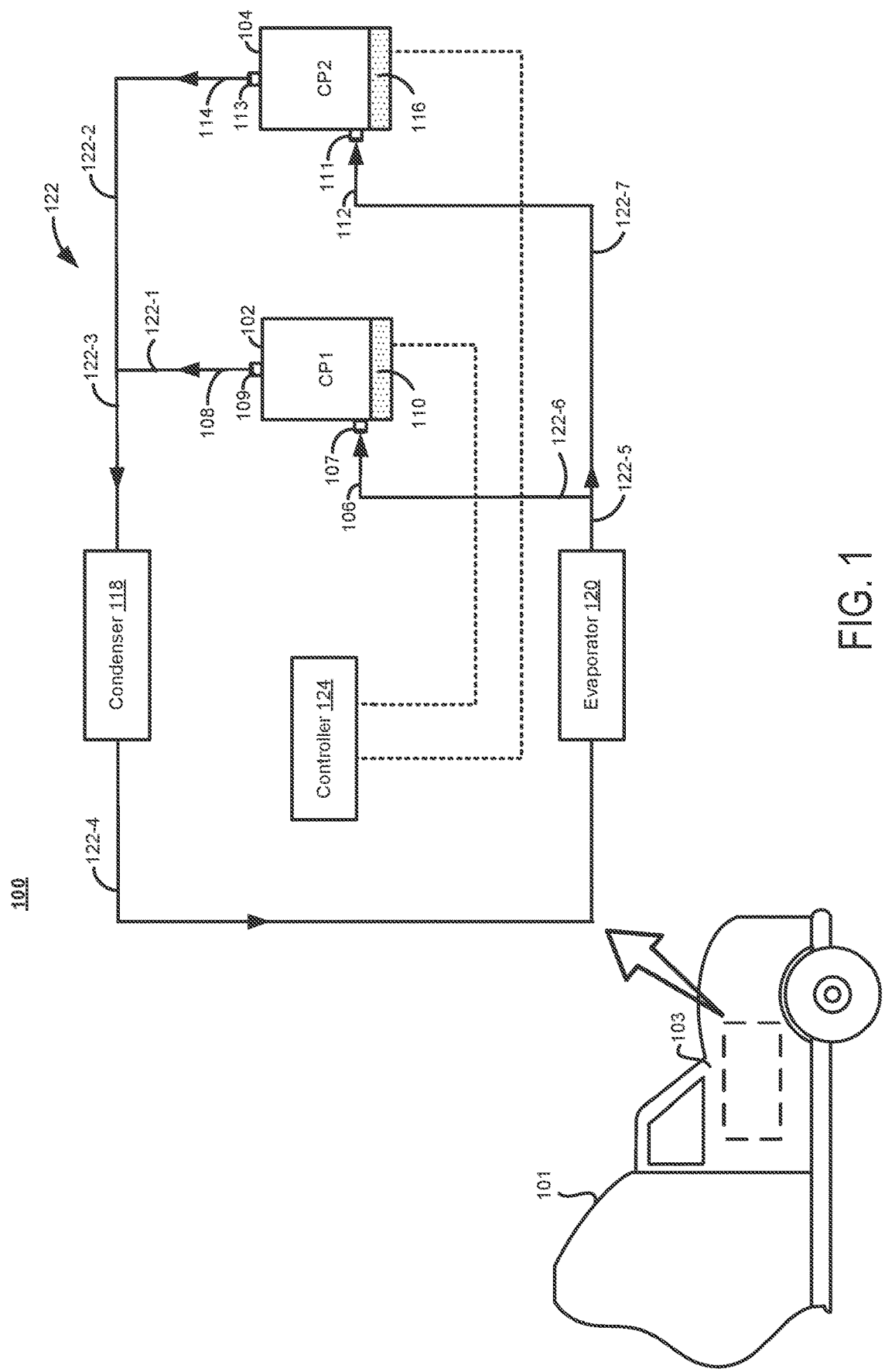
FIG. 1 is a block diagram illustrating a climate system in accordance with some embodiments.

Reference will now be made in detail to implementations of the present application as illustrated in the accompanying drawings. The same reference indicators will be used throughout the drawings and the following detailed description to refer to the same or like parts. Those of ordinary skill in the art will realize that the following detailed description of the present application is illustrative only and is not intended to be in any way limiting. Other embodiments of the present application will readily suggest themselves to such skilled persons having benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

Embodiments of the present disclosure are described in the context of climate systems for use in vehicles and methods for controlling the climate systems. As used herein, a vehicle can be a car, a van, a truck, a bus, a trailer, or other automobiles. A climate system of the present disclosure in general includes two or more compressors that are connected fluidly in parallel but with no oil equalizing system disposed there between. The climate system also includes a condenser (e.g., a first refrigerant-to-air heat exchanger), an evaporator (e.g., a second refrigerant-to-air heat exchanger) and refrigerant lines fluidly connecting the compressors, condenser and evaporators to form a refrigerant circuit. A controller is included in the climate system and a novel method is used to control the compressors to draw back compressor oil that is entrained in the refrigerant or carried away by the refrigerant during operation of the climate system. As used herein, the term "compressor oil" refers to a material (e.g., oil, lubricant, sealant) that is used to cool, seal, or lubricate components (e.g., gears) of a compressor. In some embodiments, the compressors are controlled independently based on thermal loads.

With no oil equalizing system, the climate system of the present disclosure is more compact and at the same time more flexible compared to conventional systems. For instance, the climate system can have compressors of different sizes and different capacities, and the compressors do not need to be mounted at the same level, height or elevation. Accordingly, the climate system of the present disclosure can be installed in various ways such as mounted on a rear wall of a sleeper compartment in a vehicle, and/or integrated with other components in the existing air conditioning systems of the vehicle. In addition, by controlling the compressors independently based on thermal loads, the present disclosure improves the system's overall efficiency. In addition, the climate system of the present disclosure requires less parts and thus has a higher reliability and lower cost than climate systems with more parts.

By way of illustration, FIG. 1 depicts a climate system (100) including a plurality of compressors such as a first compressor (102) and a second compressor (104), a condenser (118), an evaporator (120), refrigerant lines and a controller (124). The first compressor (102) includes a first refrigerant inlet (106) and a first refrigerant outlet (108). The second compressor (104) includes a second refrigerant inlet (112) and a second refrigerant outlet (114). The first compressor (102) and the second compressor (104) are fluidly connected to each other in parallel in terms of the refrigerant. For example, in the illustrated embodiment, the first refrigerant inlet (106) of the first compressor (102) is fluidly connected to the second refrigerant inlet (112) of the second compressor (104) by refrigerant lines (e.g., 122-6, 122-7); and the first refrigerant outlet (108) of the first compressor (102) is fluidly connected to the second refrigerant outlet (114) of the second compressor (104) by refrigerant lines (e.g., 122-1, 122-2).

The first compressor (102) further includes a first oil sump (110) and the second compressor (104) includes a second oil sump (116). The first oil sump (110) of the first compressor (102) is independent of the second oil sump (116) of the second compressor (104). As used herein, the term "oil sump" refers to a reservoir that houses lubricant for cooling, sealing, or lubricating internal components such as gears of a compressor. In some cases, the oil sump is a tank, an oil pan, or simply a space at the bottom of a crankcase of a compressor. In some embodiments, independency between the first oil sump (110) and the second oil sump (116) is characterized in that the first oil sump (110) of the first compressor (102) is not fluidly connected to the second oil sump (116) of the second compressor (104). As used herein, the first oil sump "not fluidly connected" to the second oil sump refers to one or more of the following configurations: (i) the first and second oil sumps are not connected by any oil equalizing system (e.g., oil line or oil conduit) that is used in conventional systems to flow oil between different oil sumps and to keep oil in different oil sumps at the same level, (ii) the first and second oil sumps are not connected by a common oil separator that is used in conventional systems to separate the oil from the refrigerant, and (iii) the first and second oil sumps are not connected by a common suction header or conduit that is used in conventional systems to return the oil after being separated from the refrigerant to the oil sumps.

In some embodiments, both the first and second compressors are rotary vane compressors. In one embodiment, at least one of the first compressor (102) and the second compressor (104) is a twin rotary vane compressor. In another embodiment, one of the first compressor (102) and the second compressor (104) is a single rotary vane compressor. It will be appreciated that the first and second compressors are not limited to rotary vane (either single or twin) compressors. Any other suitable compressors including reciprocating, scroll, screw, or centrifugal compressors can be used in the climate system of the present disclosure. In some embodiments, the first refrigerant inlet (106) of the first compressor (102) includes two or more refrigerant intake ports (107), and the first refrigerant outlet (108) of the first compressor (102) includes two or more refrigerant discharge ports (109). Similarly, in some embodiments, the second refrigerant inlet (112) of the second compressor (104) includes two or more refrigerant intake ports (111), and the second refrigerant outlet (114) of the second compressor (104) includes two or more refrigerant discharge ports (113). In some embodiments, the two or more refrigerant intake ports are connected to one another. In some embodiments, the two or more refrigerant outlet ports are connected to one another.

The condenser (118) is disposed downstream of the plurality of compressors and fluidly connected to the plurality of compressors by refrigerant lines (e.g., 122-1, 122-2, 122-3). The evaporator (120) is disposed downstream of the condenser (118) and fluidly connected to the condenser (118) by a refrigerant line (e.g., 122-4). In some embodiments, the evaporator (120) is also fluidly connected to the plurality of compressors by refrigerant lines (e.g., 122-5, 122-6, 122-7), thus forming a refrigerant circuit for circulating the refrigerant.

During operation of the climate system (100), the plurality of compressors compresses a refrigerant into a compressed refrigerant, the condenser (118) condenses the refrigerant that has been compressed by the plurality of compressors, and the evaporator (120) evaporates the refrigerant that has been condensed by the condenser (118). The evaporator (120) is thermally coupled to a compartment (103) of the vehicle (101) to cool the compartment. As used herein, the term "thermally coupled" refers to one or more of the following: (i) the evaporator is mounted within a corresponding compartment (103) to exchange heat with that compartment or with the air in that compartment, and (ii) the evaporator is coupled with a device (e.g., heat exchanger or air blower) which introduces conditioned air into that compartment (103). The compartment (103) can be a cab compartment, a sleeper compartment, a combination of cab and sleeper compartments, or any space in a vehicle.

As shown in FIG. 1, the controller (124) is electrically coupled to the first and second compressors. The controller (124) is configured to automatically and independently control operation of the first and second compressors to draw back compressor oil to the first and second compressors. In some embodiments, to draw compressor oil that is entrained in the refrigerant or carried away by the refrigerant back to the first oil sump (110), the controller (124) operates the first compressor (102) at a first low speed range for a first low-speed time period before turning off the first compressor (102). In one embodiment, operating the first compressor (102) at the first low speed range for the first low-speed time period is performed every time when the first compressor (102) is to be turned off. In another embodiment, operating the first compressor (102) at the first low speed range for the first low-speed time period is performed every other time when the first compressor (102) is to be turned off. In some embodiments, whether to operate the first compressor (102) at a low speed range to draw back compressor oil is determined based on how long the first compressor (102) has been running at a high speed range. For example, in some embodiments, to draw compressor oil back to the first oil sump (110), the controller (124) operates the first compressor (102) at the first low speed range for the first low-speed time period after the first compressor (102) has been operated at a first high speed range for a first high-speed time period.

Similarly, to draw compressor oil that is entrained in the refrigerant or carried away by the refrigerant back to the second oil sump (116), in some embodiments, the controller (124) operates the second compressor (104) at a second low speed range for a second low-speed time period before turning off the second compressor (104). In one embodiment, operating the second compressor (104) at the second low speed range for the second low-speed time period is performed every time when the second compressor (104) is to be turned off. In another embodiment, or operating the second compressor (104) at the second low speed range for the second low-speed time period is performed every other time when the second compressor (104) is to be turned off. In some embodiments, whether to operate the second compressor (104) at a low speed range to draw back compressor oil is determined based on how long the second compressor (104) has been running at a high speed range. For example, in some embodiments, to draw compressor oil back to the second oil sump (116), the controller (124) operates the second compressor (104) at the second low speed range for the second low-speed time period after the second compressor (104) has been operated at a second high speed range for a second high-speed time period.

In some embodiments, the first or second low speed range is between 1500 and 3000 rpm (revolutions per minute), between 1500 and 4500 rpm, or between 1500 and 6500 rpm. In some embodiments, the first or second low-speed time period before turning off the first or second compressor (104) is between 5 and 20 seconds, between 20 and 100 seconds, or between 100 and 200 seconds. In some embodiments, the first or second high speed range is between 1500 and 3000 rpm, between 1500 and 4500 rpm, or between 1500 and 6500 rpm. In some embodiments, the first or second high-speed time period is between 5 and 20 seconds, between 20 and 100 seconds, or between 100 and 200 seconds In some embodiments, the controller (124) is configured to automatically and independently control operation of the first and second compressors based at least partially on a thermal load of the compartment. In some embodiments, the controller (124) turns on the first or the second compressor when the thermal load of the compartment is equal to or less than a first threshold, and turns on both the first and the second compressors when the thermal load of the compartment exceeds the first threshold. In an embodiment, the first and second compressors have the same capacity. In another embodiment, the first and second compressors have different capacities. In some embodiments, the first threshold of the thermal load corresponds to the capacity of the first or the second compressor. In some embodiments, the first threshold of the thermal load is between 0.4 kW (kilowatts) and 0.8 kW, between 0.4 kW and 1.0 kW, or between 0.4 kW and 1.6 kW.

Figure 2:
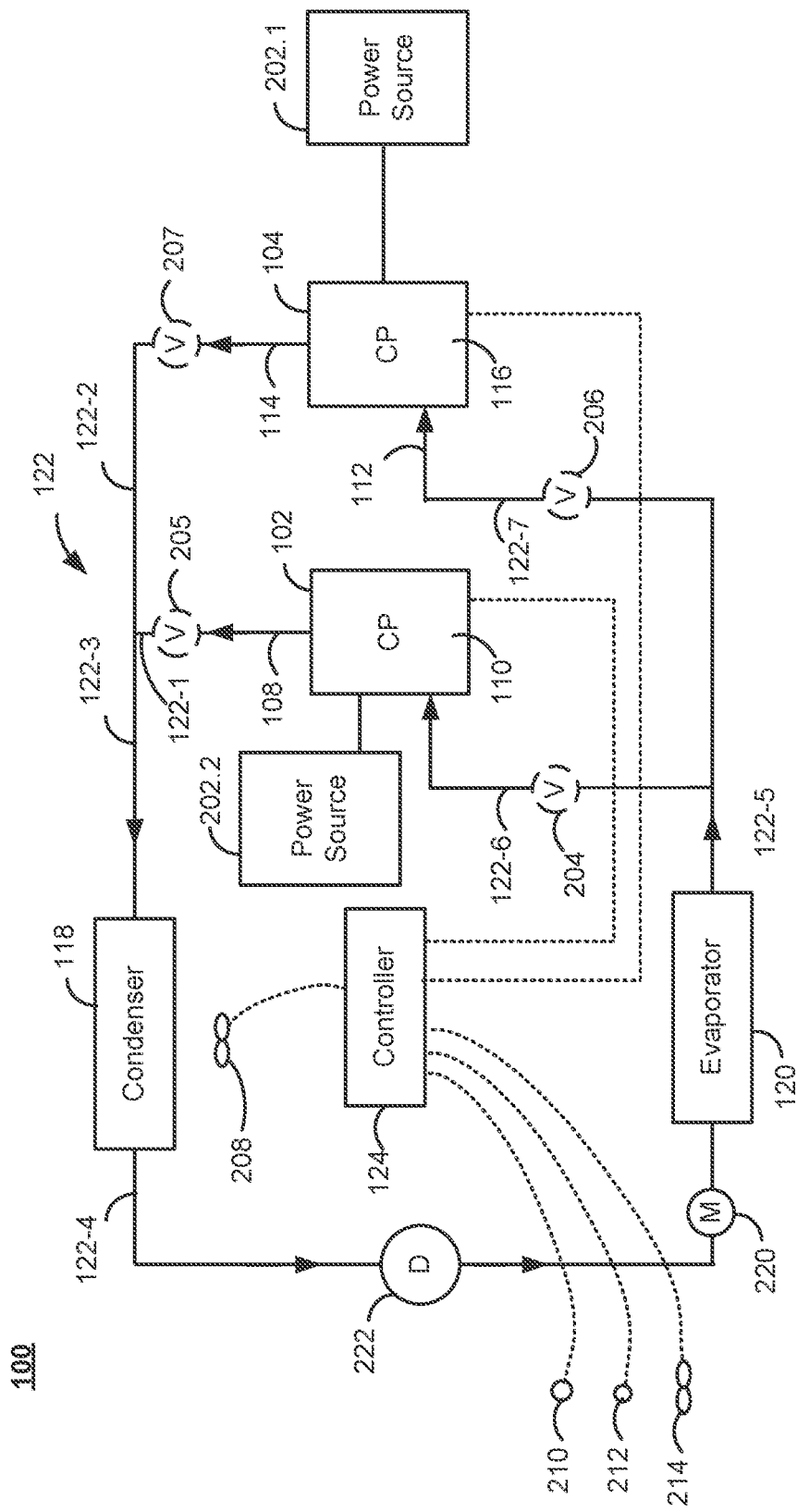
FIG. 2 is a block diagram illustrating the climate system of FIG. 1, including some additional and/or optional components.

Referring to FIG. 2, in some embodiments, the climate system (100) of the present disclosure further includes other additional or optional components. For instance, in some embodiments, the climate system (100) further includes a first plurality of flow control valves such as a first flow control valve (204) and a second flow control valve (206). The first flow control valve (204) is disposed upstream of the first compressor (102) and configured to selectively restrict or permit flow of the refrigerant to the first compressor (102). The second flow control valve (206) is disposed upstream of the second compressor (104) and configured to selectively restrict or permit flow of the refrigerant to the second compressor (104). In some additional embodiments, the climate system (100) further includes a second plurality of flow control valves such as a third flow control valve (205) and a fourth flow control valve (207). The third flow control valve (205) is disposed downstream of the first compressor (102) and configured to selectively restrict flow of the refrigerant to the first compressor (102) (e.g., when the first compressor is dormant). The fourth flow control valve (207) is disposed downstream of the second compressor (104) and configured to selectively restrict flow of the refrigerant to the second compressor (104) (e.g., when the second compressor is dormant).

Additionally or alternatively, in some embodiments, a refrigerant line coupling the evaporator (120) to the first compressor (102) and the second compressor (104) includes a vertical split between the first compressor (102) and the second compressor (104). More specifically, the refrigerant line coupling the evaporator (120) to the first compressor (102) and the second compressor (104) splits into a first refrigerant line (122-6) that couples to the evaporator (120) to an inlet of the first compressor (102), and is partially vertical with respect to a position of the first compressor (102); a second refrigerant line (122-7) that couples to the evaporator (120) to an inlet of the second compressor (104), and is partially vertical with respect to a position of the second compressor (104). Vertical, for purposes of this disclosure, is an angle that is greater than zero such that the respective refrigerant line is above the respective compressor. In some embodiments, each vertical refrigerant line (e.g., the first refrigerant line (122-6) and the second refrigerant line (122-7)) has the same or distinct vertical angles. Examples of the different vertical angles are described below with reference to FIGS. 8A-8C.

The vertical angles of the first refrigerant line (122-6) and the second refrigerant line (122-7) restrict the flow of compressor oil to inactive compressors as well as fluidically coupled low-side components of the climate system (e.g., an evaporator, a suction line, and any accessory components located within the suction line). In particular, the use of partially vertical refrigerant lines reduces the amount of compressor oil trapped in dormant components of the climate system (100) or low-side components of the climate system further ensuring that there is adequate lubrication for each compressor. In some embodiments, the first refrigerant line (122-6) and the second refrigerant line (122-7) cause the second compressor to maintain a second predetermined oil circulation ratio (OCR) (e.g., at least 3 percent) or an oil mass of greater than a second predetermined oil mass (e.g., 40 g) while the climate system (100) is in operation. In some embodiments, the first refrigerant line (122-6) and the second refrigerant line (122-7) cause the second compressor to maintain an OCR between 3 percent and 8 percent while the climate system (100) is in operation. In some embodiments, the first refrigerant line (122-6) and the second refrigerant line (122-7) cause the first compressor to maintain a first predetermined OCR (e.g., at least 3.5 percent) while the climate system (100) is in operation. In some embodiments, the climate system (100) including the first refrigerant line (122-6) and the second refrigerant line (122-7) has a first predetermined starting and a first predetermined ending charge level (e.g., at least 135 g) for the first compressor (102), and a second predetermined starting and a second predetermined ending charge level (e.g., at least 150 g) for the second compressor (104). Values of the first predetermined OCR, the second predetermined OCR, the second predetermined oil mass, the first predetermined baseline oil mass (e.g., the first predetermined starting and the first predetermined ending charge level), and the second predetermined baseline oil mass (e.g., the second predetermined starting and the second predetermined ending charge level) are based on the configuration of the climate system and/or the one or more components of the climate system. The OCR percentage and oil amount requirements can be different for each climate system.

In some embodiments, the climate system (100) further includes one or more air blowers. For instance, in the illustrated embodiment, the climate system (100) further includes a first air blower (208) positioned proximate the condenser (118). The first air blower (208) is configured to blow air over the condenser (118) to cool the condenser (118), and/or to vent interior air of the compartment to reduce the thermal load of the compartment. In some embodiments, the climate system (100) further includes a second air blower (214) electrically coupled to the controller (124). The second air blower (214) is configured and controlled by the controller (124) to vent the interior air of the compartment to outside, and/or to suck in the ambient or fresh air into the compartment. In some embodiments, the climate system (100) is integrated with an existing air conditioning system of the vehicle. In such cases, the first air blower (208) and/or the second air blower (214) are shared by the climate system (100) and the existing air conditioning system. In an embodiment, the first and second air blowers are mounted in the same compartment (e.g., sleep compartment or cab compartment). In another embodiment, the first and second air blowers are mounted in different compartments, for instance, the first air blower (208) in the sleeper compartment and the second air blower (214) in the cab compartment.

To automatically control the compressors, air blowers and/or other components in the system, in some embodiments, the climate system (100) of the present disclosure further includes a sensor (210) for measuring an atmosphere temperature and a thermostat (212) for setting a desired temperature and monitoring an interior temperature in the compartment. In such embodiments, the controller (124) is electrically coupled to the sensor (210) and the thermostat (212) and automatically control operations of other components (e.g., air blower, compressor) based on the atmosphere temperature, the interior temperature and the settings (e.g., desired temperature). For instance, when the interior temperature is higher than both of the atmosphere temperature and the desired temperature, the controller (124) turns on the first air blower (208) to vent interior air from the compartment before turning on the first or second compressor. In embodiments with a second air blower (214), the controller (124) additionally or optionally turns on the second air blower (214) to suck in the ambient or fresh air into the compartment. As such, the thermal load is reduced before turning on the compressors, and consequently the overall efficiency of the climate system is improved. When the interior temperature is lowered to the atmosphere temperature and the desired temperature is lower than the atmosphere temperature, the controller (124) turns on the first and/or second compressors to cool the compartment further down to the desired temperature. The controller (124) operates the first and/or second compressors (e.g., controlling the speed of a compressor) in accordance with the desired temperature and the atmosphere temperature.

In some embodiments, one or more compressors are driven by electrical power source or sources (202). In an embodiment, all of the compressors are driven by electrical power source or sources (202). In some embodiments, at least one compressor is driven by the internal combustion engine of the vehicle. By way of illustration, FIG. 2 shows the first compressor (102) is configured to be driven by the internal combustion engine, and the second compressor (104) is an electrically driven compressor. The second compressor (104) is configured to operate when the internal combustion engine of the vehicle is not running.

Continuously referring to FIG. 2, in some embodiments, the climate system (100) of the present disclosure further includes a metering device (220) disposed upstream of the evaporator (120). The metering device (220) is configured to control the flow of the refrigerant into the evaporator (120). Examples of the metering device (220) include a thermal expansion valve, a capillary tube, or the like. In some embodiments, the metering device (220) is electrically coupled to the controller (124) and its operation is automatically controlled by the controller (124).

In some embodiments, the climate system (100) further includes a receiver/drier (222) disposed at the refrigerant line (122-4) between the condenser (118) and the evaporator (120). The receiver/drier (222) is configured to temporarily store the refrigerant, absorb moisture from the refrigerant, or both.

Figure 3:
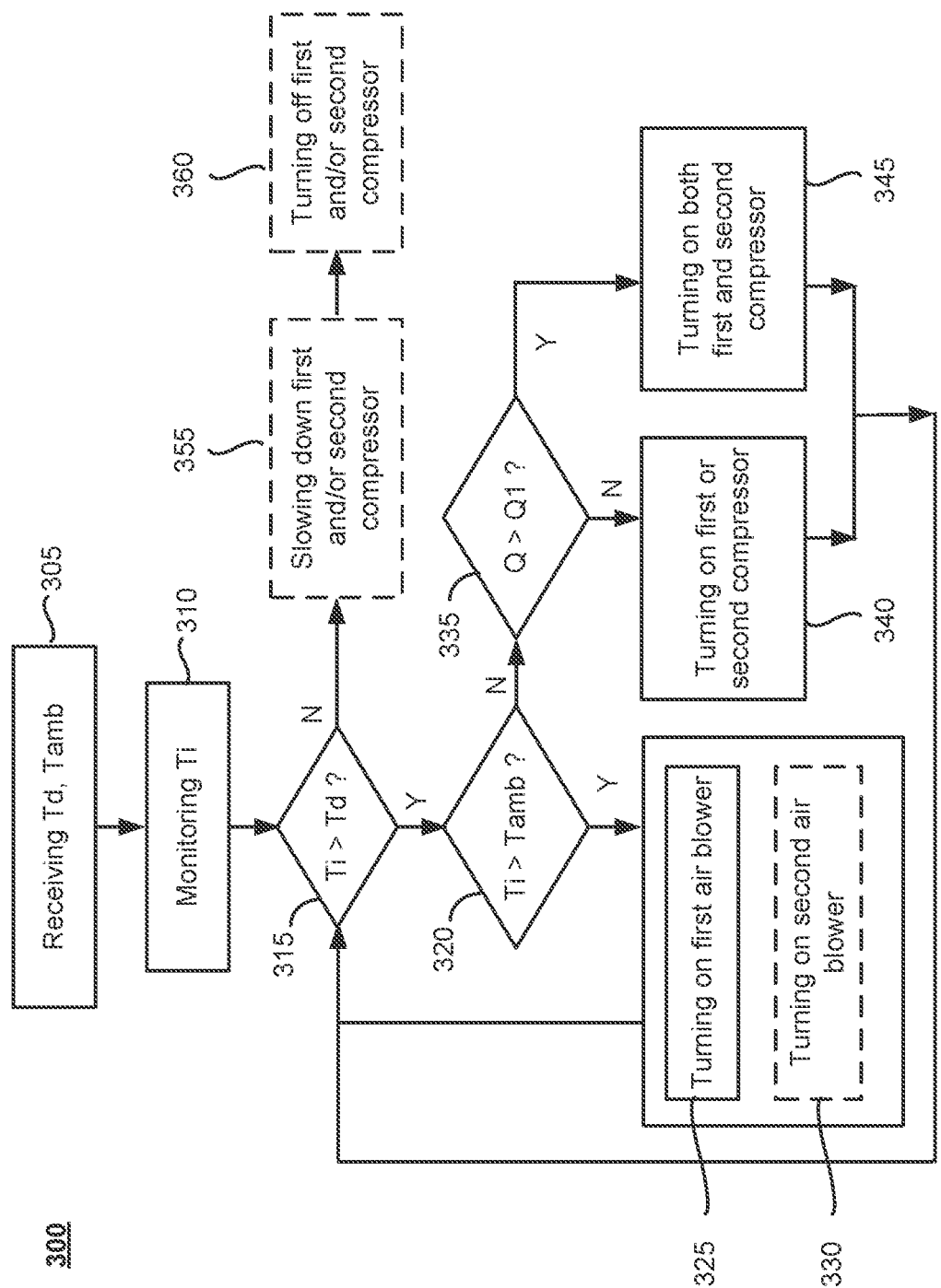
FIG. 3 is a flowchart illustrating a first exemplary method for controlling a climate system in accordance with some embodiments.
Figure 4:
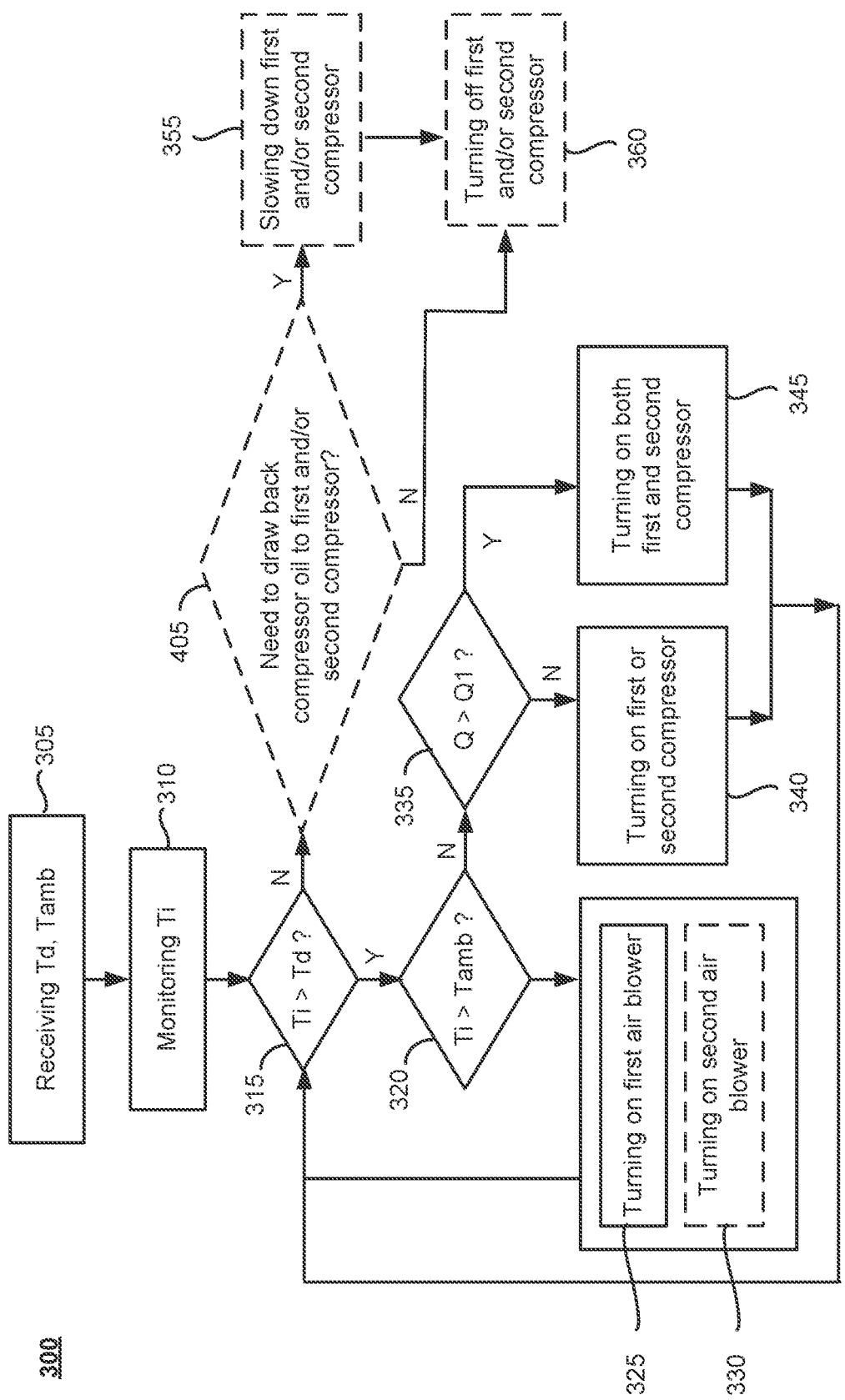
FIG. 4 is a flowchart illustrating the first exemplary method of FIG. 3, including some additional and/or optional steps.
Figure 5:
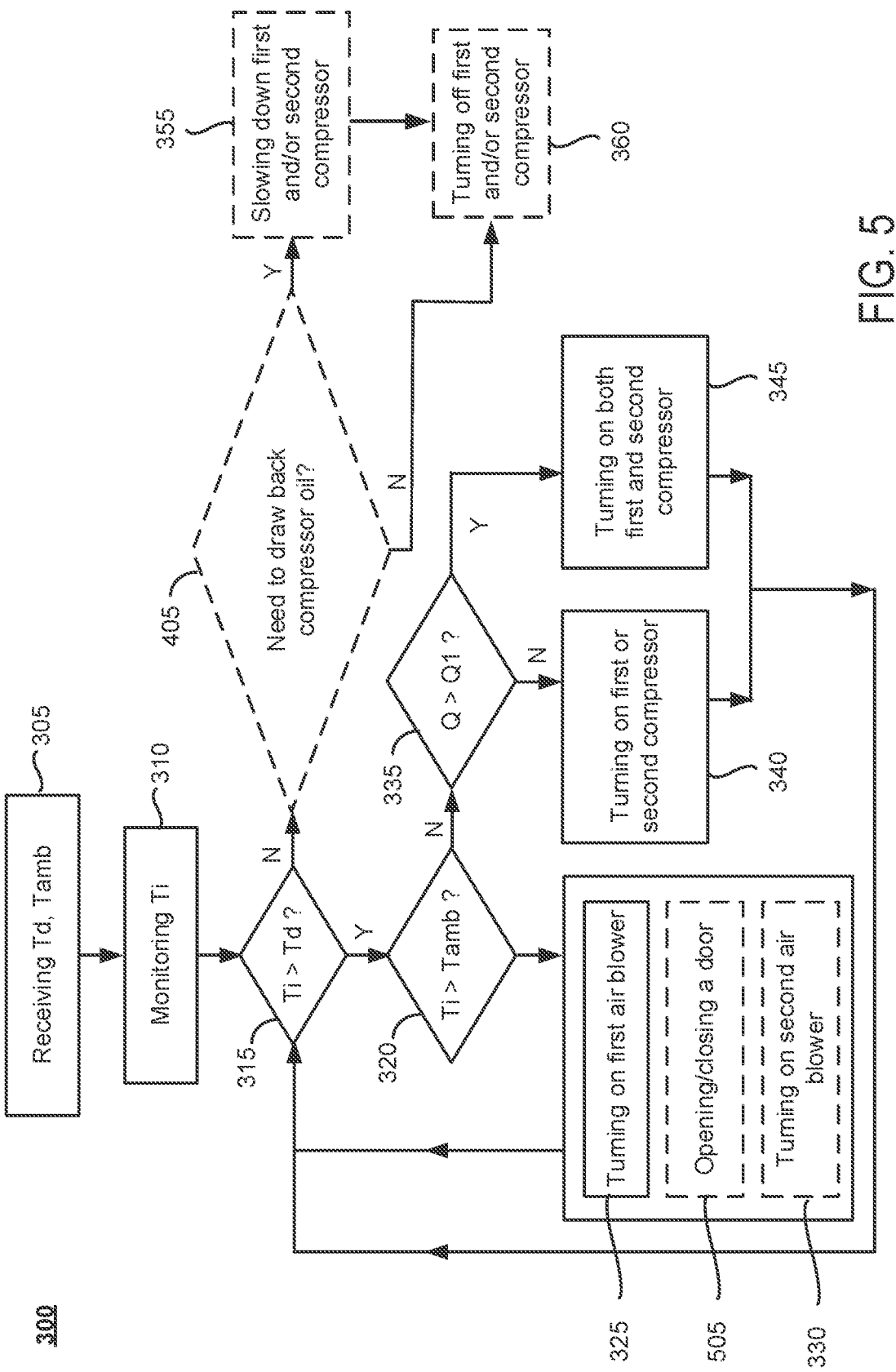
FIG. 5 is a flowchart illustrating the first exemplary method of FIG. 3, including some other additional and/or optional steps.

Turning now to FIGS. 3-5, there depict a first method (300) for controlling climate systems in accordance with some embodiments of the present disclosure. For illustration purpose, the first method (300) is described in the context of a climate system that includes a first compressor and a second compressor in parallel, i.e., the refrigerant inlets of the first and second compressors are fluidly connected to each other and refrigerant outlets of the first and second compressors are fluidly connected to each other. The climate system further includes a condenser disposed downstream of the first and second compressors and fluidly connected to the first and second compressors, and a first air blower positioned proximate the condenser and configured to blow air over the condenser. The climate system is installed in a vehicle for cooling a compartment of the vehicle.

In some embodiments, the first method (300) is governed by instructions that are stored in and executed by a controller such as the controller (124) illustrated in FIGS. 1 and 2. In some embodiments, the first method (300) is governed by instructions that are stored in and executed by an electronic device other than the controller (124) illustrated in FIGS. 1 and 2.

In some embodiments, the first method (300) includes: receiving a desired temperature for the compartment and an atmosphere temperature outside of the vehicle (step 305); monitoring an interior temperature in the compartment of the vehicle (step 310); determining whether the interior temperature is higher than the desired temperature (step 315); determining whether the interior temperature is higher than the atmosphere temperature (step 320); turning on the first air blower to vent interior air in the compartment, if the interior temperature exceeds both the desired temperature and the atmosphere temperature (step 325); determining whether the thermal load of the compartment exceeds a first thermal threshold, if the interior temperature is higher than the desired temperature but lower than or equal to the atmosphere temperature (step 335); turning on the first compressor or the second compressor if the thermal load of the compartment is less than or equal to a first thermal threshold (step 340); and turning on both the first compressor and the second compressor if the thermal load of the compartment exceeds the first thermal threshold (step 345).

In some embodiments, the climate system includes a second air blower, or the climate system is coupled to an existing air conditioning system and an air blower of the existing air conditioning system serves as a second air blower to the climate system. In such embodiments, the first method (300) includes an additional or optional step (step 330) that turns on the second air blower to suck in ambient or fresh air into the compartment of the vehicle, if the interior temperature exceeds both the desired temperature and the atmosphere temperature. The first and second air blowers may be operated simultaneously, alternately, or independently.

In some embodiments, the first method (300) automatically turns off the first compressor and/or the second compressor when the interior temperature is lowered to the desired temperature or when cooling is no longer desired (step 360). In some embodiments, before turning off the first compressor and/or second compressor, the first method (300) operates the first compressor at a first low speed range for a first low-speed time period before turning off the first compressor to allow compressor oil drawn back to the first oil sump and/or operates the second compressor at a second low speed range for a second low-speed time period before turning off the second compressor to allow the compressor oil drawn back to the second oil sump (step 355).

In some embodiments, operating the first compressor at the first low speed range for the first low-speed time period is performed every time when the first compressor is to be turned off or every other time when the first compressor is to be turned off. Similarly, in some embodiments, operating the second compressor at the second low speed range for the second low-speed time period is performed every time when the second compressor is to be turned off or every other time when the second compressor is to be turned off.

In some embodiments, the first method (300) further includes an additional or optional step 405, to determine whether it is needed to draw back compressor oil to one or more compressors. If it is determined that drawing back compressor oil is needed for a compressor, the first method (300) proceeds to step 355 to slow down that compressor (e.g., operating that compressor at a low speed range for a period of time) before turning it off at step 360. Otherwise, the first method (300) proceeds to step 360 to turn off that compressor. In some embodiments, the determination is based on how long the compressor has been running at a high speed range. For example, in some embodiments, operating the first compressor at the first low speed range for the first low-speed time period is performed after the first compressor is operated at a first high speed range for a first high-speed time period. Operating the second compressor at the second low speed range for the second low-speed time period is performed after the second compressor is operated at a second high speed range for a second high-speed time period.

In some embodiments, the second air blower is selectively in fluidic communication with the ambient, a fresh air system of the vehicle or the compartment of the vehicle through a duct such as a pipe, a conduit, a channel, a tube, or the like. In some embodiments, a door is implemented to control the air flow. In such embodiments, the first method (300) includes an additional or optional step 505, which opens or closes the door before turning on the second air blower to allow the second air blower to blow the ambient or fresh air into the compartment of the vehicle.

Figure 6:
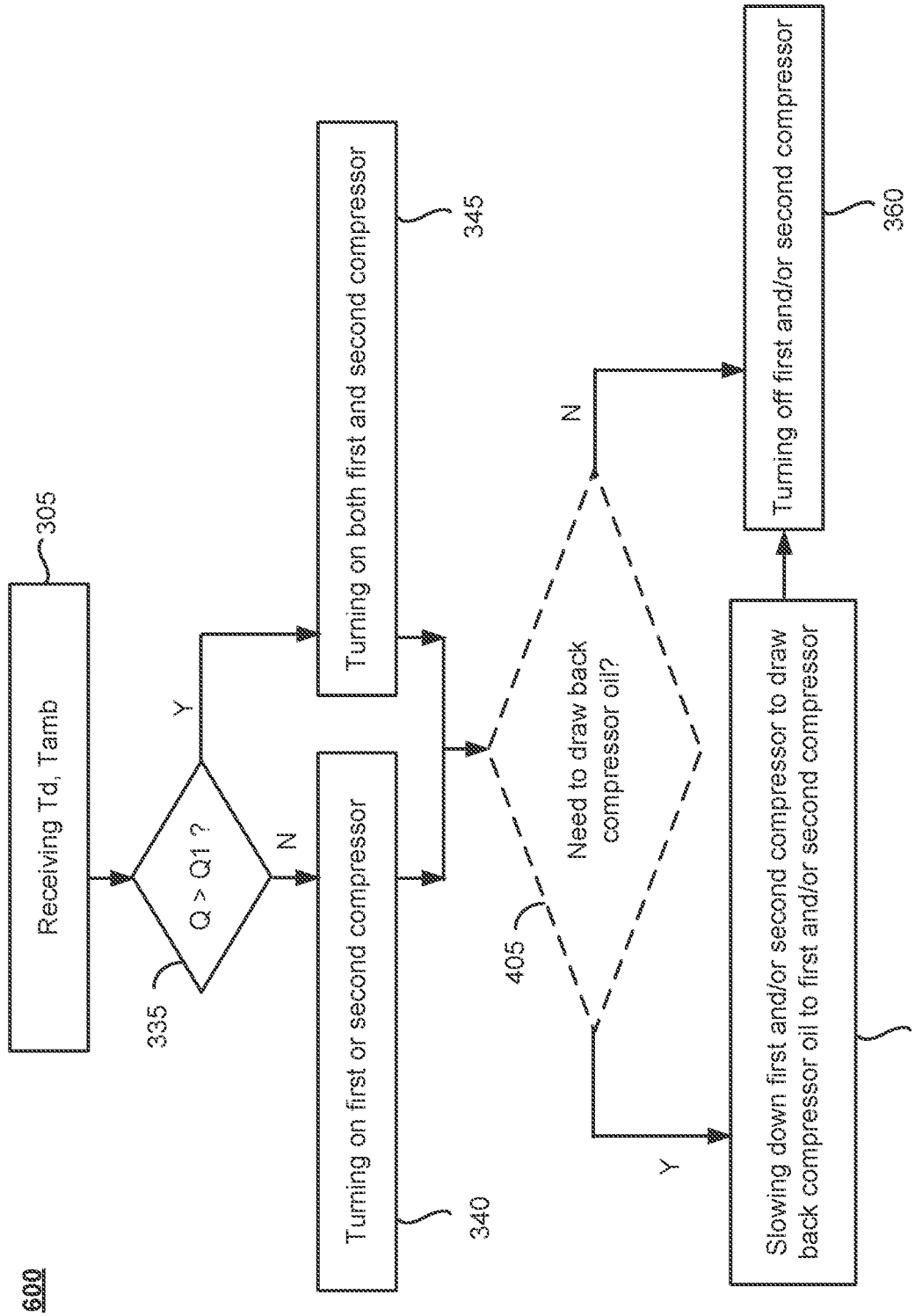
FIG. 6 is a flowchart illustrating a second exemplary method for controlling a climate system in accordance with some embodiments.

Referring to FIG. 6, there depicts a second method (600) for controlling climate systems in accordance with some embodiments of the present disclosure. For illustration purpose, the second method (600) are described in the context of a climate system that includes a first compressor and a second compressor in parallel, i.e., the refrigerant inlets of the first and second compressors are fluidly connected to each other and refrigerant outlets of the first and second compressors are fluidly connected to each other. The climate system further includes a condenser disposed downstream of the first and second compressors and fluidly connected to the first and second compressors. The climate system is installed in a vehicle for cooling a compartment of the vehicle.

Like the first method (300), in some embodiments, the second method (600) is governed by instructions that are stored in and executed by a controller such as the controller (124) illustrated in FIGS. 1 and 2. In some embodiments, the second method (600) is governed by instructions that are stored in and executed by an electronic device other than the controller (124) illustrated in FIGS. 1 and 2.

In some embodiments, the second method (600) includes: receiving a desired temperature for the compartment and an atmosphere temperature outside of the vehicle (step 305); determining whether a thermal load of the compartment exceeds a first thermal threshold (step 335); turning on the first compressor or the second compressor if the thermal load of the compartment is less than or equal to a first thermal threshold (step 340); turning on both the first compressor and the second compressor if the thermal load of the compartment exceeds the first thermal threshold (step 345); and performing one or more of the following: operating the first compressor at a first low speed range for a first low-speed time period before turning off the first compressor to allow compressor oil drawn back to the first oil sump; and operating the second compressor at a second low speed range for a second low-speed time period before turning off the second compressor to allow the compressor oil drawn back to the second oil sump (step 355).

In some embodiments, prior to operating the first and/or second compressor at a low speed range (step 355), the second method (600) further include one or more of the following additional or optional steps: determining whether it is needed to draw back compressor oil to the first compressor based on whether the first compressor has been running at a first high speed range and for how long; and determining whether it is needed to draw back the compressor oil to the second compressor based on whether the second compressor has been running at a second high speed range and for how long (step 405). Based on the results of the determination, in some embodiments, the second method (600) further includes one or more of the following: operating the first compressor at a first low speed range for a first low-speed time period to draw back compressor oil to the first compressor if the first compressor has been operated at the first high speed range for a first high-speed time period; and operating the second compressor at a second low speed range for a second low-speed time period to draw back compressor to the second compressor if it is determined that the second compressor has been operated at the second high speed range for a second high-speed time period.

Figure 7:
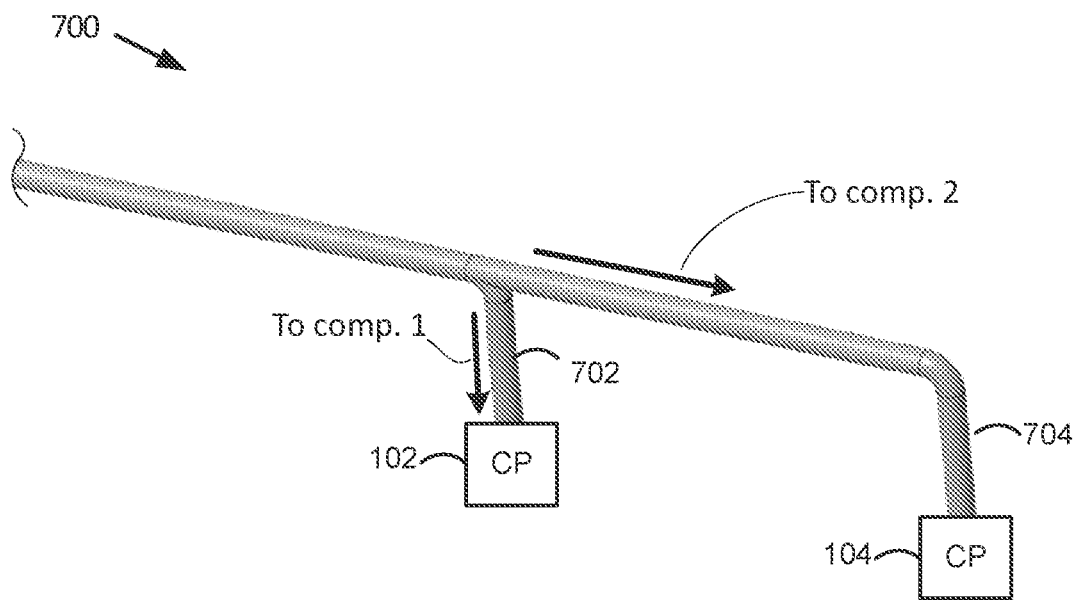
FIG. 7 illustrates a climate system including horizontal refrigerant lines coupling an evaporator with one or more compressors, in accordance with some embodiments.

FIG. 7 illustrates a climate system including horizontal refrigerant lines coupling an evaporator with one or more compressors, in accordance with some embodiments. In particular, climate system (700) includes a first horizontal refrigerant line (702) and a second horizontal refrigerant line (704) coupling an evaporator (e.g., evaporator 120; FIGS. 1 and 2) to the first and second compressors (102) and (104). The horizontal configuration of the refrigerant lines does not mitigate or reduce the flow of compressor oil to dormant or inactive compressors without additional mitigation. Without additional mitigation, climate control system 700 causes compressor oil to migrate from the second compressor (104), e.g., an electrical compressor, to the first compressor (102), e.g., a mechanical compressor, during operation resulting in inadequate lubrication for the compressors. In order to control the flow of compressor oil between the first and second compressors, climate system 700 utilizes any method described above and shown in reference to FIGS. 3-6.

Figure 8A:
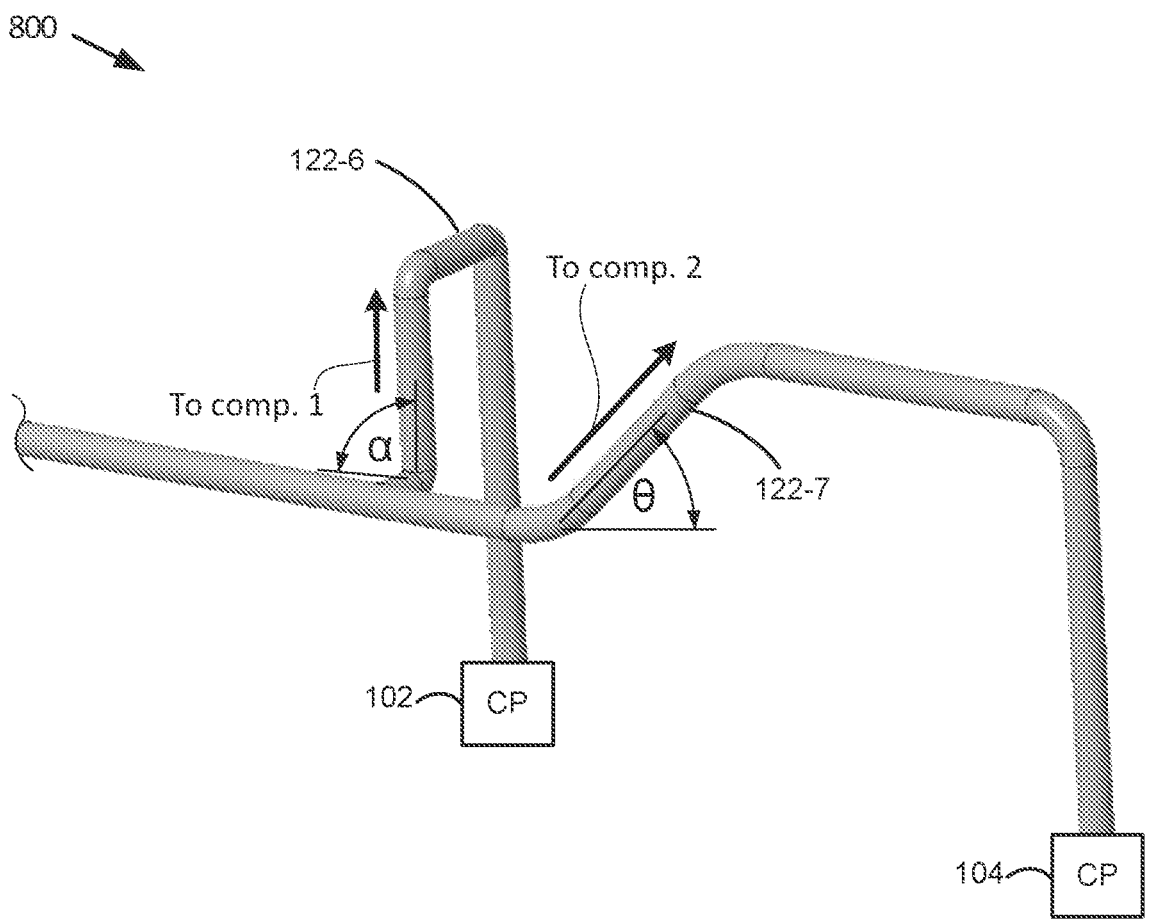
FIGS. 8A-8C illustrate a climate system including vertical refrigerant lines coupling an evaporator with one or more compressors, in accordance with some embodiments.
Figure 8B:
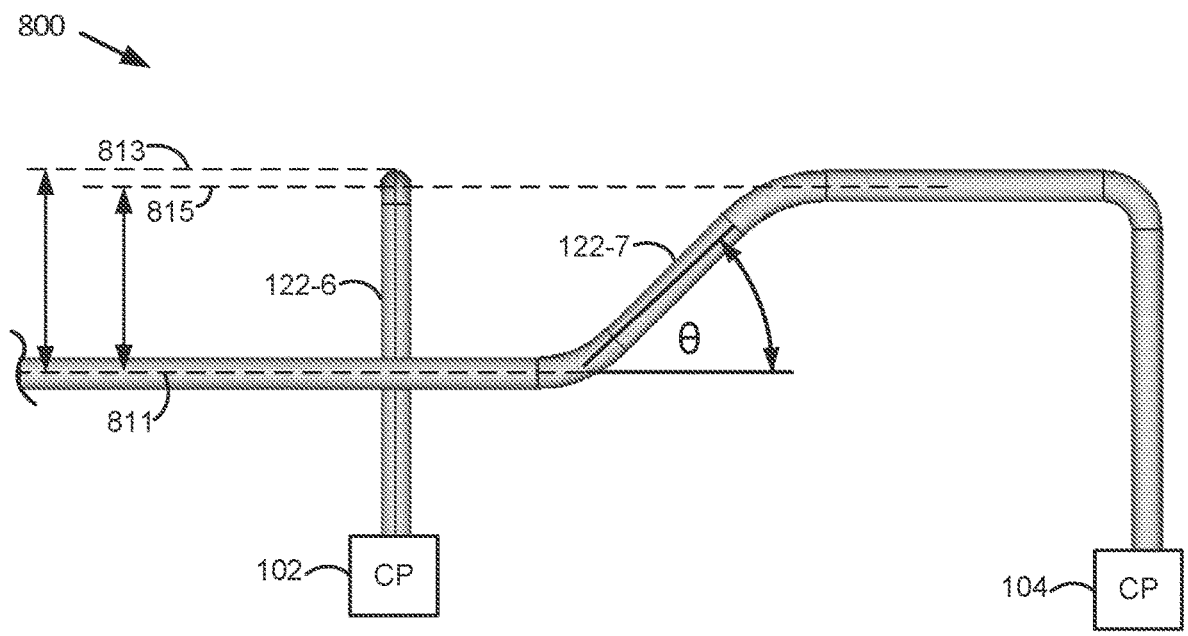
Figure 8C:
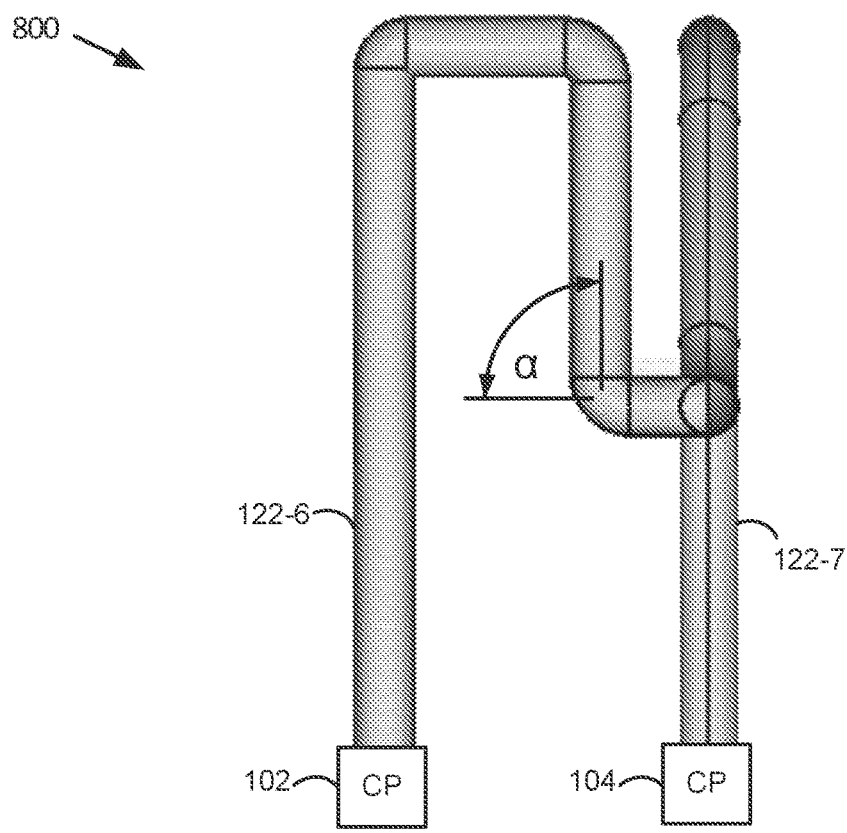

FIGS. 8A-8C illustrate a climate system including vertical refrigerant lines coupling an evaporator with one or more compressors, in accordance with some embodiments. The climate system (800) can include one or more components described above in reference to FIGS. 1 and 2. The climate system (800) includes a first refrigerant line (122-6) and a second refrigerant line (122-7) coupling an evaporator (e.g., evaporator 120; FIGS. 1 and 2) to the first and second compressors (102) and (104). The partially vertical configuration of the refrigerant lines mitigates or reduces the flow of compressor oil to dormant or inactive compressors without additional mitigation. In particular, the first refrigerant line (122-6) fluidly couples to the first compressor (102) inlet and is at least partially vertical with respect to a position of the first compressor (102) such that compressor oil is caused to travel upwards before reaching the first compressor (102) restricting a flow of the compressor oil to the first compressor (102) while the first compressor (102) is inactive; and the second refrigerant line (122-7) fluidly couples to the second compressor (104) inlet and is at least partially vertical with respect to a position of the second compressor (104) such that compressor oil is caused to travel upwards before reaching the second compressor (104) restricting a flow of the compressor oil to the second compressor (104) while the first compressor (104) is inactive. Use of a vertical split allows the climate system (800) to mitigate or reduce the flow of compressor oil to dormant components without adjusting operation of the compressors and/or the use of flow control valves.

In FIG. 8B, the respective heights of the vertical split are shown. In some embodiments, the first refrigerant line (122-6) includes a first section configured to cause any compressor oil mixed in the refrigerant to flow from a first lower elevation (811) to a first higher elevation (813) before flowing to the first compressor (102) to restrict a flow of compressor oil to the first compressor (102) when the first compressor (102) is inactive. Similarly, the second refrigerant line (122-7) includes a second section configured to cause any compressor oil mixed in the refrigerant to flow from a second lower elevation (not shown) to a second higher elevation (815) before flowing to the second compressor (104) to restrict a flow of compressor oil to the second compressor (104) when the second compressor (104) is inactive. In some embodiments, the first lower elevation (811) and the second lower elevation are the same or distinct. Similarly, in some embodiments, the first higher elevation (813) and the second higher elevation (815) are the same or distinct. In some embodiments, the respective elevations are measured from a flat surface (e.g., a ground). For example, the climate system (800) can be incorporated in a vehicle and the different elevations are measured from the ground to the height of the respective sections. The elevations are based on the zenith height for a respective section of refrigerant line. Additionally, a lower elevation for purposes of this disclosure, in some embodiments, means having a height less than a height to which it is compared. Similarly, a higher elevation for purposes of this disclosure, in some embodiments, means having a height greater than a height to which it is compared.

In some embodiments, the first section of the first refrigerant line (122-6) extends longitudinally from the first lower elevation (811) to the first higher elevation (813) at a first angle (e.g., α; FIG. 8C) from a centerline (e.g., imaginary line parallel with the first lower elevation (811)) of the first lower elevation (811). Similarly, in some embodiments, the second section of the second refrigerant line (122-7) extends longitudinally from the second lower elevation (which in FIG. 8 is the same as the first lower elevation (811)) to the second higher elevation (815) at a second angle (e.g., θ) from a centerline (e.g., imaginary line parallel with the second lower elevation) of the second lower elevation. In some embodiments, the first and second angles α and θ are greater than zero. In some embodiments, the first and second angles α and θ are between 5 to 90 degrees. In some embodiments, the first and second angles α and θ are between 15 to 60 degrees. In some embodiments, the first and second angles α and θ are between 30 to 45 degrees. Alternatively, in some embodiments, the first and second angles α and θ are greater than 90 degrees but less than 180 degrees. The first and second angles α and θ can be the same or distinct.

In FIG. 8C, an alternate view of the vertical split is shown. In some embodiments, the first refrigerant line (122-6) is at least partially vertical with respect to a position of the first compressor (102). For example, the first refrigerant line (122-6) can have an angle α such that it is not horizonal with the first compressor (102). Angle α, in some embodiments, is greater than zero degrees. In some embodiments, angle α is between 5 to 15 degrees, between 15 to 30 degrees, between 30 to 45 degrees, between 45 to 90, etc. In some embodiments, angle α is perpendicular with respect to a position of the first compressor (102). Similarly, the second refrigerant line (122-7) is partially vertical with respect to a position of the second compressor (104). For example, the second refrigerant line (122-7) can have an angle θ such that it is not horizonal with the second compressor (104). Angle θ, in some embodiments, is greater than zero degrees. Angle θ can be the same or different than angle α.

The climate system (800) can mitigate or reduce the transfer of compressor oil between dormant components for different operating speeds of the first and second compressors (102) and (104), for different operation times of the first and second compressors (102) and (104), and for a number of different cycles of the first and second compressors (102) and (104). For example, the first compressor (102) can operate at a speed between 900 RPM to 2500 RPM and the second compressor (104) can operate at a speed between 1100 RPM to 1800 RPM while maintaining a first predetermined OCR (e.g. at least 3.5% to 8%) for the first compressor (102) and maintaining a second predetermined OCR (e.g., at least 3% to 8%) for the second compressor (104). The above values are of the first compressor, the second compressor, the first predetermined OCR, and the second predetermined OCR, are based on a particular configuration of a climate system and/or the one or more components of the climate system. As such the above values can be different for different climate systems.

While the climate system (800) can mitigate or reduce the flow of compressor oil to dormant or inactive compressors without adjusting operation of the compressors and/or use of one or more flow valves (e.g., a first flow control valve (204) and a second flow control valve (206); FIG. 2), as described above in reference to FIG. 3-6, the different techniques can be combines to further mitigate or prevent the transfer of compressor oil between dormant components.

While the primary examples discussed herein relate to a climate system used in a vehicle, it is also contemplated that the climate system can be used in other machines, such as construction and agricultural machines. The climate system disclosed herein can be incorporated in any mobile thermal management applications. For example, the climate system including vertical refrigerant lines coupling an evaporator with one or more compressors described above in FIG. 8 can also be incorporated in drills, draglines, tractors, buildings, office spaces, etc.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that, although the terms "first," "second," etc. may be used herein to describe various elements, these elements should not be limited by these terms. These terms are only used to distinguish one element from another. For example, a first compressor could be termed a second compressor, and, similarly, a second compressor could be termed a first compressor, without changing the meaning of the description, so long as all occurrences of the "first compressor" are renamed consistently and all occurrences of the "second compressor" are renamed consistently.

What is claimed is:

1. A climate system for conditioning air within a compartment of a vehicle, comprising:
   a refrigerant circuit;
   a first compressor fluidly coupled to the refrigerant circuit, where the first compressor includes a first compressor inlet and a first compressor outlet;
   a second compressor fluidly coupled to the refrigerant circuit, the second compressor including a second compressor inlet and a second compressor outlet;
   a first refrigerant-to-air heat exchanger fluidly coupled to the first compressor outlet and the second compressor outlet via a first set of one or more refrigerant lines, wherein the first refrigerant-to-air heat exchanger is thermally coupled to an exterior of the vehicle and forms part of the refrigerant circuit;
a second refrigerant-to-air heat exchanger (i) fluidly coupled to the first refrigerant-to-air heat exchanger via a second set of one or more refrigerant lines and (ii) fluidly coupled to the first compressor inlet and the second compressor inlet via a third set of one or more refrigerant lines, wherein:
the second refrigerant-to-air heat exchanger is thermally coupled to the compartment of the vehicle and forms part of the refrigerant circuit, and
a first refrigerant line of the third set of one or more refrigerant lines includes a first section configured to cause any compressor oil mixed in the refrigerant to flow from a first lower elevation to a first higher elevation before flowing to the first compressor to restrict a flow of compressor oil to the first compressor when the first compressor is inactive; and
a second refrigerant line of the third set of one or more refrigerant lines includes a second section configured to cause any compressor oil mixed in the refrigerant to flow from a second lower elevation to a second higher elevation before flowing to the second compressor to restrict a flow of compressor oil to the second compressor when the second compressor is inactive; and
a controller communicatively coupled to the first and second compressors and including instructions that are configured to selectively activating and deactivating the first and second compressors.

2. The climate system of claim 1, wherein the second compressor maintains an oil circulation ration (OCR) between 3 percent to 8 percent or an oil mass of greater than 40 g while the climate system is in operation.

3. The climate system of claim 1, wherein the first compressor maintains an oil circulation ration (OCR) between 3.5 percent to 8 percent.

4. The climate system of claim 1, wherein:
a starting and ending charge level of the first compressor is at least 135 g; and
a starting and ending charge level of the second compressor is at least 150 g.

5. The climate system of claim 1, wherein:
the first compressor is configured to be driven by an internal combustion engine; and
the second compressor is an electrically driven compressor.

6. The climate system of claim 1, wherein the first section of the first refrigerant line extends longitudinally from the first lower elevation to the first higher elevation at a first angle from a centerline of the first lower elevation.

7. The climate system of claim 6, wherein the first angle is between 5 to 90 degrees.

8. The climate system of claim 7, wherein the first angle is between 15 to 60 degrees.

9. The climate system of claim 8, wherein the first angle is between 30 to 45 degrees.

10. The climate system of claim 1, wherein the second section of the second refrigerant line extends longitudinally from the second lower elevation to the second higher elevation at a second angle from a centerline of the second lower elevation.

11. The climate system of claim 10, wherein the first angle is between 5 to 90 degrees.

12. The climate system of claim 11, wherein the first angle is between 15 to 60 degrees.

13. The climate system of claim 12, wherein the first angle is between 30 to 45 degrees.

14. The climate system of claim 1, wherein the controller is further configured to:
disable the first or the second compressor in accordance with a thermal load of the compartment meeting one or more criteria; and
enable both the first and the second compressors in accordance with the thermal load of the compartment not meeting the one or more criteria.

15. The climate system of claim 1, further comprising a first air blower positioned proximate the first heat exchanger, and configured to do one or more of the following: (i) blow air over the first heat exchanger, and (ii) vent interior air of the compartment to reduce the thermal load of the compartment.

16. The climate system of claim 15, further comprising:
a sensor configured to measure an atmosphere temperature; and
a thermostat configured to enable a user to set a desired temperature and to monitor an interior temperature of the compartment;
wherein the controller is electrically coupled to the sensor, the thermostat, and the first air blower; and
wherein the controller further includes instructions configured to cause the performance of one or more of the following:
in accordance with the interior temperature being higher than both of the atmosphere temperature and the desired temperature, turning on the first air blower to vent interior air from the compartment; and
in accordance with the interior temperature being below the atmosphere temperature and the desired temperature being below the atmosphere temperature:
operating at least one of the first compressor and the second compressor; and
controlling operations of the first and second compressors in accordance with the desired temperature and the atmosphere temperature.

17. The climate system of claim 15, further comprising a second air blower installed in the vehicle and configured to pull fresh air into the compartment;
wherein the controller is electrically coupled to the second air blower; and
wherein the controller is further configured to perform one or more of the following:
control the first air blower to vent the interior air of the compartment to outside; and
control the second air blower to pull fresh air into the compartment.

18. The climate system of claim 17, wherein the climate system is integrated with an existing air conditioning system of the vehicle, and wherein the first air blower and the second air blower are shared by the climate system and the existing air conditioning system.

19. The climate system of claim 1, further comprising a metering device coupled to the second set of one or more refrigerant lines disposed upstream of the second refrigerant-to-air heat exchanger and configured to regulate flow of the refrigerant into the second refrigerant-to-air heat exchanger.

20. The climate system of claim 19, wherein the metering device is a thermal expansion valve or a capillary tube.

21. The climate system of claim 1, further comprising a receiver/drier coupled to the second set of one or more refrigerant lines and disposed between the first heat exchanger and the second heat exchanger and configured to perform one or more of the following: (i) temporarily store the refrigerant, and (ii) absorb moisture from the refrigerant.

22. The climate system of claim 1, wherein the first compressor and the second compressor are coupled in parallel with one another.

23. The climate system of claim 1, wherein the first lower elevation is the same as the second lower elevation.

24. The climate system of claim 1, wherein the first lower elevation is distinct from the second lower elevation.

25. The climate system of claim 1, wherein the first higher elevation is the same as the second higher elevation.

26. The climate system of claim 1, wherein the first higher elevation is distinct from the second higher elevation.

27. The climate system of claim 1, wherein the controller further includes instructions that are configured to selectively adjust operation of the first and second compressors.

28. The climate system of claim 27, wherein selectively adjusting operation of the first and second compressors includes adjusting a speed of the first and/or second compressors.

29. The climate system of claim 27, wherein the third set of refrigerant lines restricts the flow of compressor oil from the active compressor to the inactive compressor without adjustments, via the controller, to the operation of the first and second compressors.

30. The climate system of claim 1, further comprising:
a first flow control valve coupled to first refrigerant line of the third set of one or more refrigerant lines and disposed upstream of the first compressor and configured to selectively restrict or permit flow of the refrigerant to the first compressor; and a second flow control valve second refrigerant line of the third set of one or more refrigerant lines and disposed upstream of the second compressor and configured to selectively restrict or permit flow of the refrigerant to the second compressor.

* * * * *